United States Patent [19]
Rozenberg

[11] Patent Number: 4,909,404
[45] Date of Patent: Mar. 20, 1990

[54] TAMPER-EVIDENT CLOSURES

[76] Inventor: Oleg Rozenberg, 2357 E. 19th St., Brooklyn, N.Y. 11229

[21] Appl. No.: 248,400

[22] Filed: Sep. 23, 1988

Related U.S. Application Data

[63] Continuation-in-part of Ser. No. 923,011, Oct. 23, 1986, Pat. No. 4,784,281, which is a continuation-in-part of Ser. No. 680,157, Dec. 10, 1984, abandoned.

[51] Int. Cl.$^4$ .............................................. B65D 41/46
[52] U.S. Cl. .................................. 215/220; 215/223; 215/224; 215/252; 215/256
[58] Field of Search ............... 215/220, 225, 256, 253, 215/252, 223, 224

[56] References Cited

U.S. PATENT DOCUMENTS

| | | | |
|---|---|---|---|
| 3,329,295 | 7/1967 | Fields | 215/252 |
| 3,650,428 | 3/1972 | Miller | 215/252 |
| 4,299,328 | 11/1981 | Ochs et al. | 215/252 |
| 4,474,301 | 10/1984 | Davis | 215/220 |
| 4,494,664 | 1/1985 | Guala | 215/252 |
| 4,503,985 | 3/1985 | Swartzbaugh et al. | 215/252 |
| 4,526,282 | 7/1985 | Dutt et al. | 215/252 |
| 4,534,480 | 8/1985 | Santostasi et al. | 215/252 |
| 4,541,536 | 9/1985 | Davis et al. | 215/252 |
| 4,555,039 | 11/1985 | Conti | 215/252 |

FOREIGN PATENT DOCUMENTS 809398 2/1959 United Kingdom ................ 215/252

*Primary Examiner*—Donald F. Norton
*Attorney, Agent, or Firm*—Klauber & Jackson

[57] ABSTRACT

A plastic unitary molded child-resistant, snap-on, tampered-evident closure includes an upper cap portion having internal spaced ribs disposed for cooperation with the upper annular collar on the neck portion of a container, only one rib being sized to pass through the gap of the upper annular collar, and the upper cap portion having an indication indicating the location of the one rib; a lower skirt portion connected to the upper cap portion and having an inside diameter close to the outside diameter of the upper cap portion; weakened intermediate portions circumferentially formed about the closure at the connection between the lower skirt portion and upper cap portion; the upper cap portion including about its circumference a plurality of vertically extending intermittently spaced grooves extending down to the weakened intermediate portions; a plurality of corresponding openings which separate the weakened intermediate portions and extend through the connection between the upper cap portion and lower skirt portion; radially inwardly directed ribs located on the interior surface of the lower skirt portion for locking engagement with the annular collar of the container, the ribs being longitudinally aligned with the grooves on the upper cap portion, vertically spaced from the upper end of the lower skirt portion and lockingly engaging the lower annular collar of the container at an engagement portion on the lower annular wall thereof, inwardly spaced from the outer peripheral wall of the lower annular collar when the closure is assembled with the container.

16 Claims, 12 Drawing Sheets

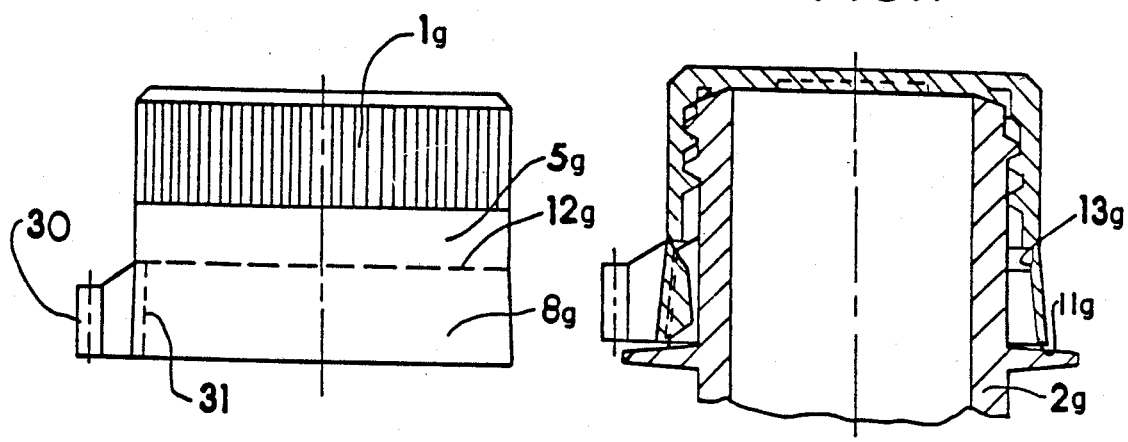
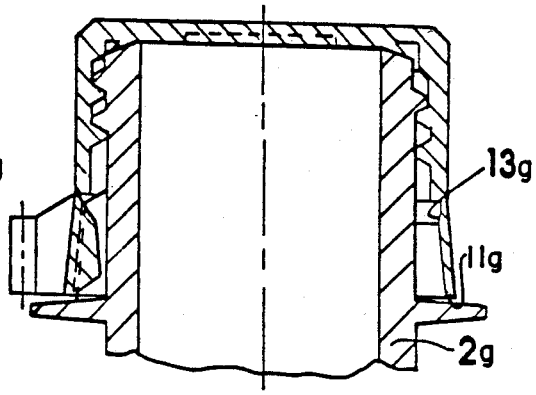
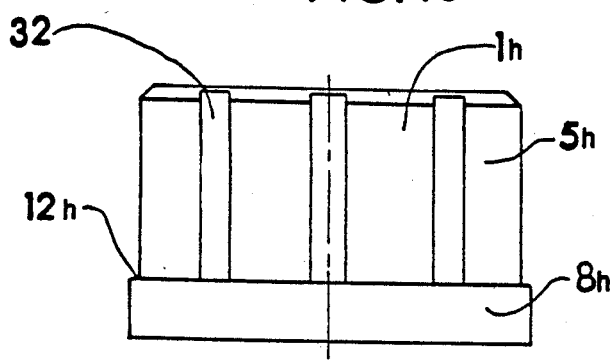
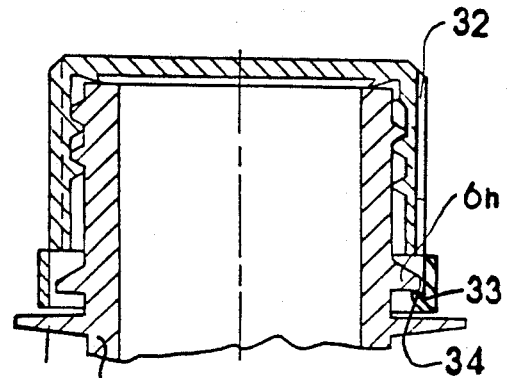
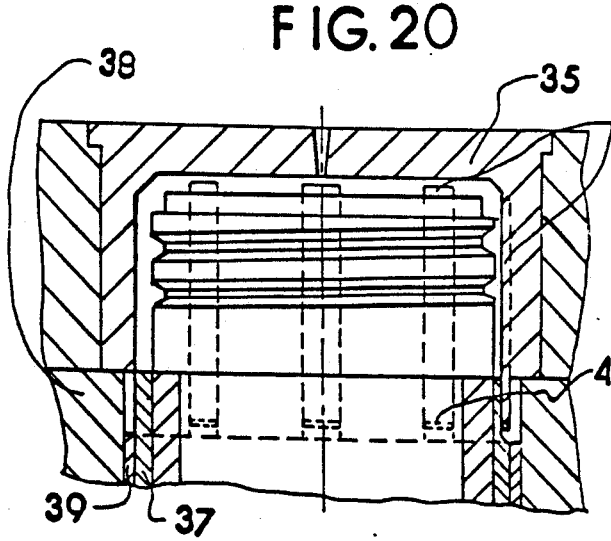
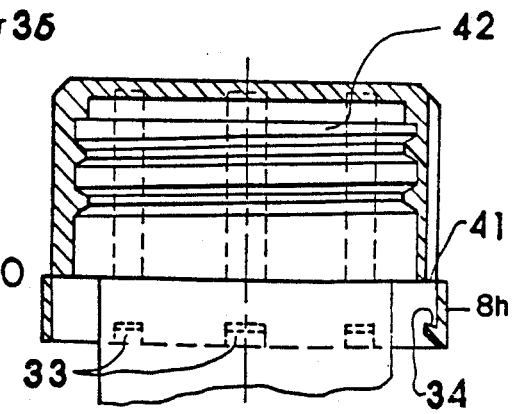

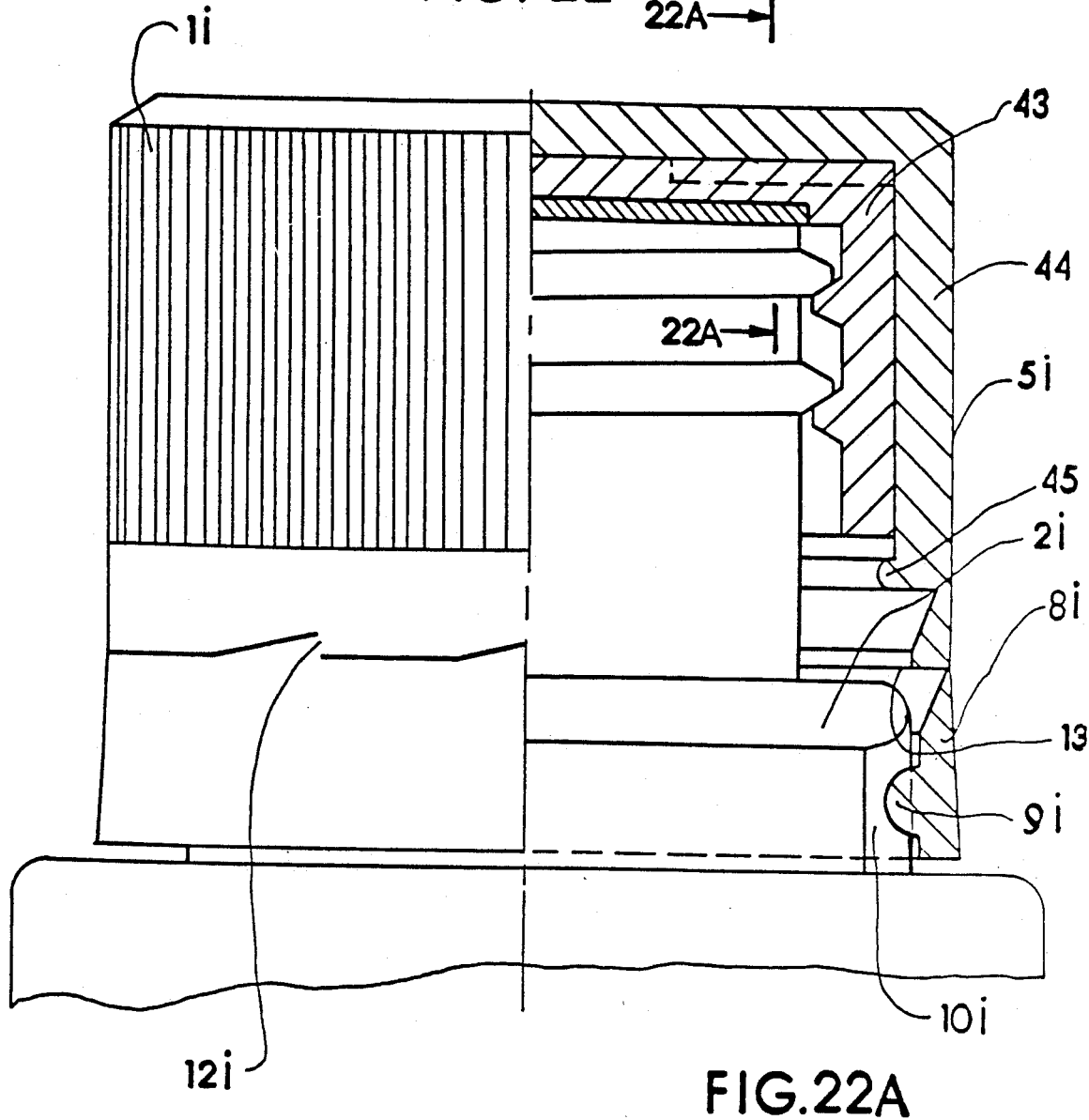

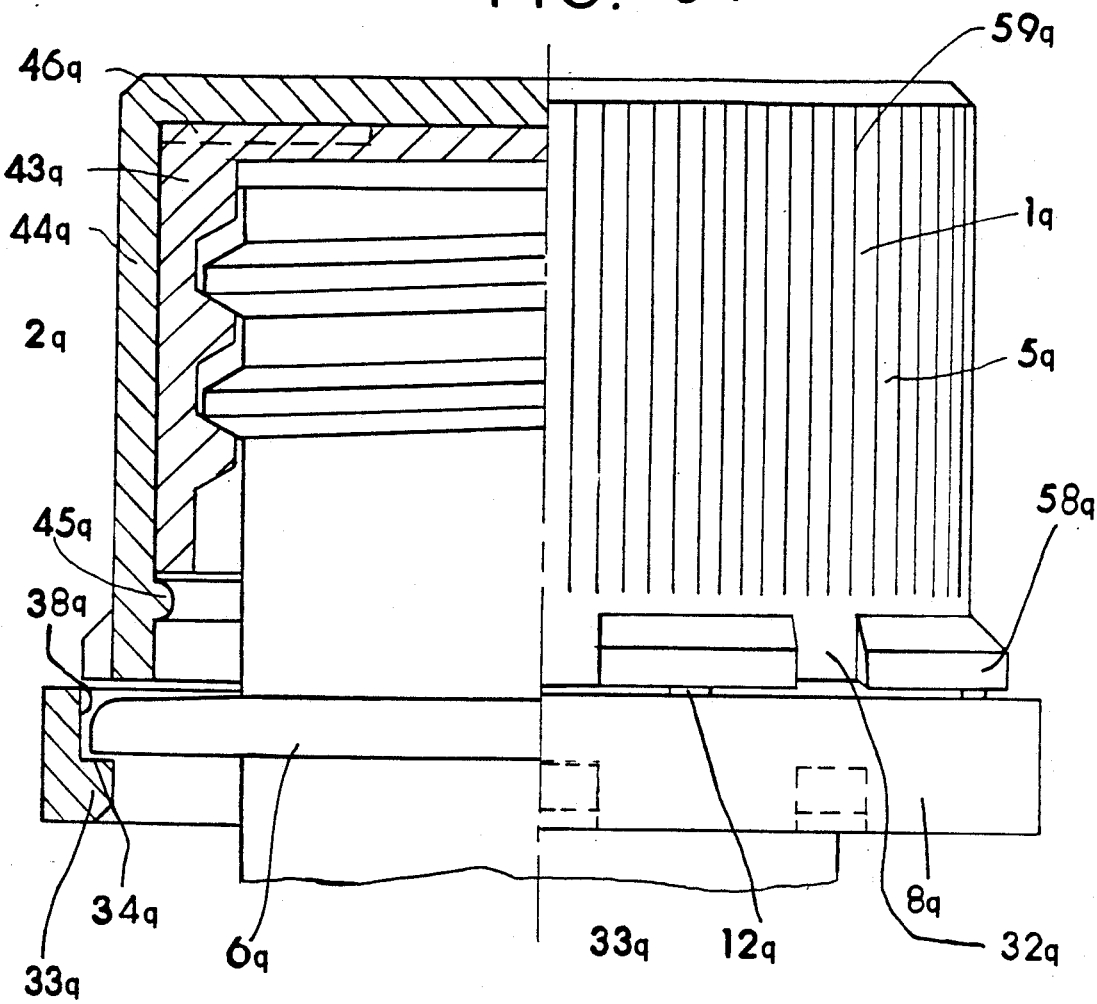

TAMPER-EVIDENT CLOSURES

REFERENCE TO RELATED APPLICATION

This Application is a Continuation-In-Part of U.S. patent application Ser. No. 923,011, filed Oct. 23, 1986 now U.S. Pat. No. 4,784,281 to the same inventor herein and entitled TAMPER-EVIDENT CLOSURES, which in turn, is a Continuation-In-Part of U.S. patent application Ser. No. 06/680,157, filed Dec. 10, 1984 to the same inventor herein and now abandoned.

BACKGROUND OF THE INVENTION-FIELD OF APPLICATION

This invention relates to closures; and more particularly, to tamper-evident closures.

BACKGROUND OF THE INVENTION-DESCRIPTION OF THE PRIOR ART

Many bottles and other containers are provided with caps, covers or closures formed to reveal whether the container has unwarrantedly been opened. Such containers and closures are used for pharmaceutical products, patent medicines; but are just as important for all products which are meant to be used for human consumption. Such closures warn the user that the contents may have been tampered with and in turn discourage the criminal practice of tampering with packaged products.

A considerable number of such containers made either of plastic or glass utilize plastic closures. However, closures of the type shown in U.S. Pat. No. 4,103,803 issued on Aug. 1, 1978 to R. T. Irvine for *Tamperproof Container And Cap Assembly*, merely provide a skirt portion separable from a cap portion by a frangible section and may be found inadequate because once the closure has been opened it cannot be re-capped.

On the other hand, container closures like those shown in U.S. Pat. No. 4,281,774 issued on Aug. 4, 1981 to G. V. Mumford for *Tamper Proof Snap Cap*, have a skirt with a lower surface which may help to slowly pry-up the closure; especially where it is by construction spaced from the container wall. When such a closure is pryed up slowly, it is possible that the tamperproof strip will not separate, and then the contents can be tampered with and the container re-closed. Meticulous opening and re-closing of such a container may be required, but those who might want to tamper with the container, seem to be willing to devote the time and effort to do so.

Other prior art container closures, like those shown in U.S. Pat. No. 3,979,003 issued on Sept. 7, 1976 to D. O. Allen for *Reusable Frangible Closure*, in U.S. Pat. No. 4,166,552 issued on Sept. 4, 1979 to G. W. Faulstich for *Plastic Cap And Container Construction* and in U.S. Pat. No. 4,438,857 issued on Mar. 27, 1984 to J. J. Bullock, 111 for *Cap And Neck Structure For A Wide-Mouth Jar*, require relatively complex and expensive mechanisms for molding into the closure the area of reduced strength that would facilitate the fracture of the skirt from the closure cap. These constructions, furthermore, are not usable with screw top jars which are often required for re-closable containers.

Container closures of the type shown in U.S. Pat. No. 4,305,517 issued on Dec. 15, 1981 to S. W. Dennis for *Tamperproof Closure*, also require quite costly and complex molds and mechanisms to form the vertical and horizontal grooves and slot arrangements needed to facilitate operation of the tab and opening of the closure. On the other hand, a closure like the one shown in U.S. Pat. No. 4,307,821 issued on Dec. 29, 1981 to J. A. McIntosh for *Container-Closure Assembly*, is for particular types of containers and is not adaptable for tamper-evident containers in general.

Container closures of the type shown in British Pat. No. 809,398 issued on Feb. 25, 1959 for *Tamper-Proof Caps For Bottles And Other Receptacles* can be easily tampered with by squeezing the lower ring between the four equally spaced teeth formed on a container neck which are engaged with the teeth formed on the inner surface of the lower portion of the closure and can be easily seen from the top of a sealed container. By squeezing the lower portion of the closure between these four teeth they can be easily disengaged and the cap unscrewed by a small amount. By carefully repeating the procedure several times the closure can be removed without any damage to the frangible area and capped again.

Some of the available tamper-evident closures are formed by first molding the cap; the cap is then cut through along a predetermined line to form a weakened area about which the cap fractures when opened. The additional operation which is needed to form the cuts through the cap requires additional cap handling and adds to the cost of the closure.

To form the cuts through the cap material during the closure molding operation, as shown in U.S. Pat. No. 4,343,408 issued on Aug. 10, 1982 to E. J. Csaszar for *Tamper-Evident Plastic Closure*, however, requires the use of quite complex and expensive molds with slides which may prove unreliable.

SUMMARY OF THE INVENTION

It is therefore an object of this invention to provide new and improved tamper-evident closures.

It is another object of this invention to provide new and improved tamper-evident closures for screw top containers.

It is yet another object of this invention to provide new and improved tamper-evident closures for snap top containers.

It is yet another object of this invention to provide new and improved tamper-evident closures with frangible areas that are stronger in one direction of rotation than in the opposite direction of rotation.

It is still another object of this invention to provide new and improved child-resistant tamper-evident closures.

It is yet still another object of this invention to provide new and improved tamper-evident closures formed to facilitate molding of the closure.

It is yet still further object of this invention to provide new and improved tamper-evident closures to facilitate ejection of the closure from the mold.

Other objects, features and advantages of the invention in its details of construction and arrangement of parts will be seen from the above, from the following description of the preferred embodiment when considered with the drawing and from the appended claims. In addition, these and other objects and advantages of the present invention will become evident from the description which follows.

BRIEF DESCRIPTION OF THE INVENTION

This invention involves tamper-evident closures; and contemplates forming the closures with a cap portion and a skirt portion connected together by a separation area of weakened construction, such that any operation of the closure to remove the closure from the container will effect separation of the skirt portion from the cap portion at the weakened area and make readily evident that the closure has been opened. The weakened area is either accomplished by forming openings, or cuts, through the closure wall from the inside of the closure during molding thereof, or by molding the closure so that the thickness of the wall at such area is relatively thin when compared to the adjacent wall portions. The closure skirt portions are also formed to facilitate ejection of the molded closure from the mold.

The invention accordingly consists in the features of construction, combination of elements, and arrangements of parts which will be exemplified in the system, device, and article of manufacture hereinafter described, and of which the scope of application is as elucidated supra as will be indicated in the appended claims. In this regard, numerous alternatives within the scope of the present invention, besides those alternatives, preferred embodiments or modes practicing the invention supra, and those to be elucidated, infra, will occur to those skilled in the art.

BRIEF DESCRIPTION OF THE DRAWING

In the drawing:

FIG. 16 is an elevational view of another embodiment of tamper-evident closure incorporating the instant invention;

FIG. 17 is an elevational view, in section, of the tamper-evident closure of FIG. 16 applied to the neck of a container shown in part and in section;

FIG. 18 is an elevational view of another embodiment of tamper-evident closure incorporating the instant invention;

FIG. 19 is an elevational view, in section, of the tamper-evident closure of FIG. 18 applied to the neck of a container shown in part and in section;

FIG. 20 is an elevational view, in section, of a mold for the molding closure shown in FIGS. 18 and 19;

FIG. 21 is an elevational view, in section, of the mold of FIG. 20 with the mold open and a closure in place thereon prior to ejection;

FIG. 22 is a view, in partial section, of a tamper-evident, child-resistant closure, incorporating the instant invention;

FIG. 22A is a sectional view taken on line 22A—22A of FIG. 22;

FIG. 34 is a view in partial section of a tamper-evident, child-resistant closure, incorporating the present invention;

FIG. 35 is a view, in partial section, of a tamper-evident closure according to another embodiment of the present invention; and FIG. 36 is a view, in partial section, of a tamper-evident closure according to another embodiment of the present invention.

DESCRIPTION OF THE PREFERRED EMBODIMENTS

Figure 1:
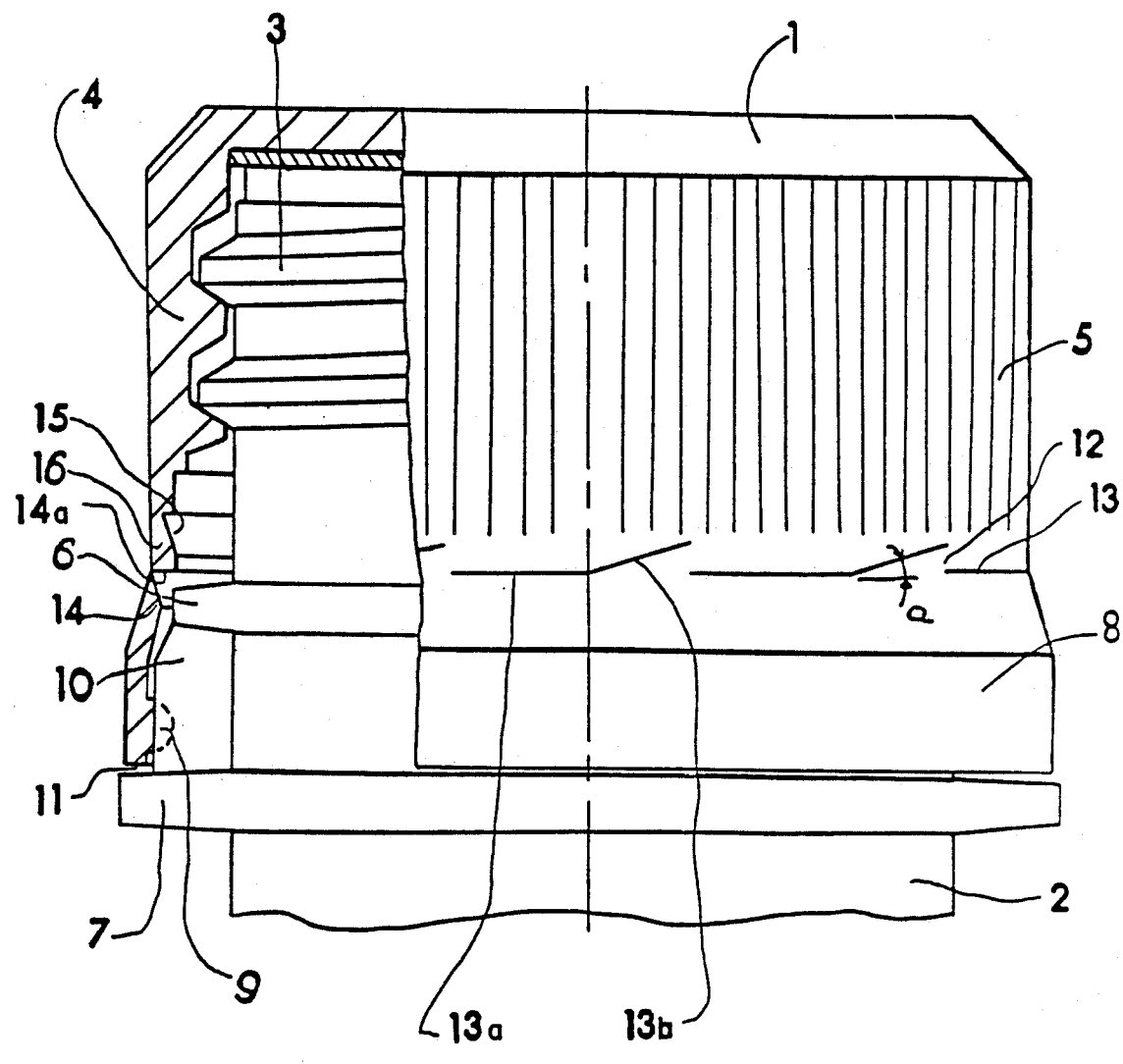
FIG. 1 is an enlarged view, in partial section, of a tamper-evident closure, incorporating the instant invention, and showing same applied to the neck of a container.

With reference to FIG. 1 there is generally shown a closure 1 for a container or bottle 2 having a threaded neck 3. Container 2 is of conventional configuration and construction and may be formed from glass, plastic or similar material. The threads on threaded neck 3 are of conventional configuration for bottles and containers used for carbonated beverages, pharmaceuticals, patent medicines, foodstuffs and the like; and are formed for mating engagement with similarly formed internal threads 4 formed within a cap or upper portion 5 of closure 1. Closure 1 is formed from suitable plastic by injection molding.

An upper collar 6 is formed around the neck 3 of container 2 as is a lower annular collar 7. Closure 1 includes an upper threaded portion 5 and a lower or skirt portion 8 which is formed with internal ratchet elements 9 that are formed and disposed for cooperation with ratchet elements 10 externally formed on container 2 between collars 6 and 7 thereof. Ratchet elements 9 and 10 cooperate in a well known manner to permit rotation of closure 1 in one direction but prevent the rotation of closure 1 in the opposite direction as long as skirt 8 is intact and in place. In addition, skirt portion 8 can be sized such that lower surface 11 is disposed closely adjacent to an upper surface of lower collar 7 so that closure 1 cannot be readily pryed up off of container 2.

Attempted rotation of closure 1 to unscrew it off of container 2 results in cooperation of ratchet elements 9 and 10 such that the continued application of force will fracture skirt 8 off of upper portion 5 around a weakened or frangible area 12 of closure 1.

Frangible area 12 is formed during the molding of closure 1 by protrusions 13 in the area thereof between the upper portion 5 of closure 1 and skirt portion 8 thereof. It should be noted that protrusions 13 are made in a certain way. Each protrusion consists of parts 13a and 13b. Portion 13a is parallel to the lower surface of skirt 11. Portion 13b is molded at an angle "a" to the bottom surface 11 of closure 1. The next cut 13a starts right under where the end of cut 13b ends and at the same level with cut 13a. The portion of plastic between cuts 13a and 13b makes the connection between the upper portion of closure 1 and the lower portion thereof frangible.

The way the frangible connection is designed makes it stronger in one direction, indicated by arrow "A", and weaker in the opposite direction.

If a force is applied between upper portion 5 of closure 1 and lower portion (skirt 8) of closure 1 in direction "A", which occurs when closure 1 is screwed on to the bottle, frangible area 12 is compressed and works like a ratchet pushing skirt 8. When a force is applied in the opposite direction, which occurs when closure 1 is unscrewed off of the bottle and the ratchets 9 of skirt are engaged with ratchets 10 of a bottle, frangible area 12 is stretched. The way cuts 13a and 13b are made induces a great amount of stress concentration during such stretching. At the same time the upper portion of protrusion 13a rides over a lower surface of a cut 13b and pushes skirt 8 downward and away from the upper portion which makes the frangible connection much weaker in this direction. That helps to avoid separation between upper and lower portions of closure 1 during the assembly on an assembly line.

Protrusions 13 are formed from the inside of closure 1 during the molding thereof. The cross-section of protrusions 13 has a shape generally similar to the shape of an axial cross-section of a cone. Each protrusion 13 has a top surface 14a and a bottom surface 14. As shown in FIG. 1 the surface 14 is disposed at an angle to the outside surface of an upper portion 5.

An annular undercut 15 is molded in upper part 5 above the protrusions 13 to facilitate ejection of closure 1 from its mold without breaking the frangible connections 12, leaving a strip of material 16 between the undercut 15 and protrusions 13. The cross-section of the undercut 15 is similar to the cross-section of protrusions 13 but the undercut 15 does not protrude through the wall of the upper portion 5.

Skirt portion 8 is formed such that it diverges outwardly from the frangible area 12 to the bottom portion of closure 1. The bottom surface 11 of skirt 8 is used to facilitate ejecting of the closure 1 from its mold.

Figure 2:
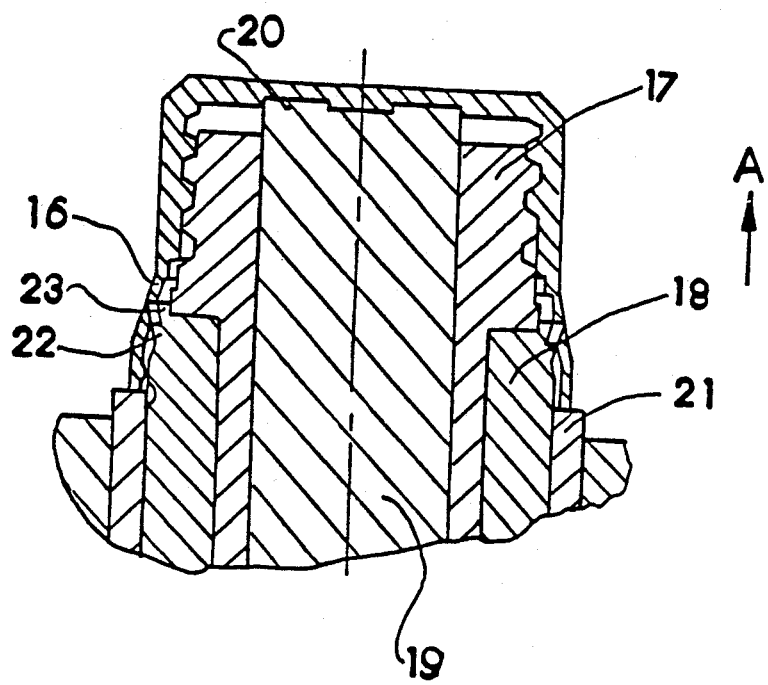
FIG. 2 is an elevational view, in section, of a mold with the mold open and the closure, incorporating the instant invention, partially ejected.
Figure 3:
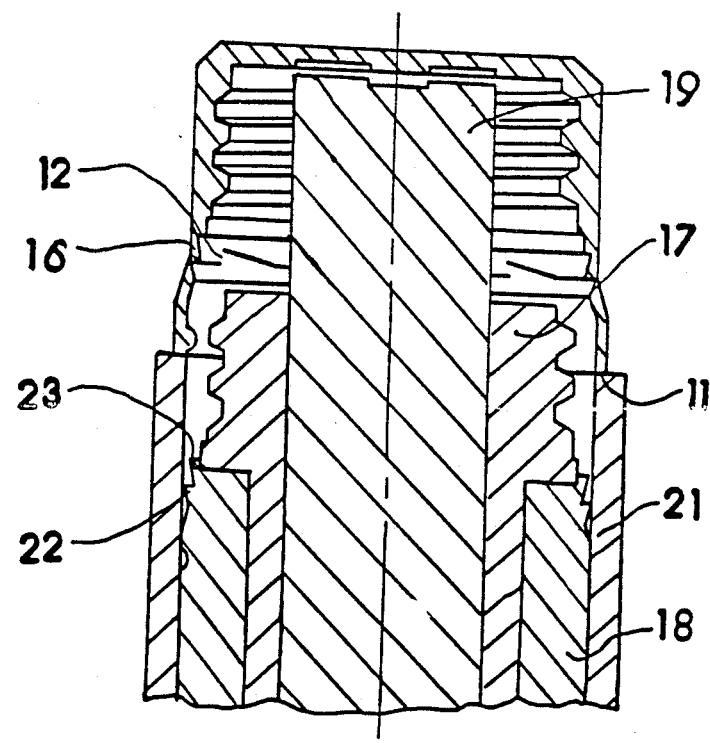
FIG. 3 is an elevational view, in section, of the mold of FIG. 2 showing a closure being ejected.

FIGS. 2 and 3 are included to facilitate an understanding of how closures, incorporating the instant invention, might be molded and describe how elements included in the instant invention assist in the molding of closure 1. A partial removal of closure 1 from its core is shown on FIG. 2. The internal core, which forms the inside of closure 1 in accordance with the present invention, comprises three elements: a threaded core 17, which forms the internal thread of closure 1, an immovable core 18, which forms the protrusions 13 with the undercut 15, and the inside core 19, which forms the top wall and ratchets 20 of closure 1. The ejector bushing 21 forms the bottom surface 11 of closure 1.

During ejection all these elements move in a certain way. The threaded core 17 can only rotate around its axis, the inside core 19 together with ejector bushing 21, moves up in the direction indicated by arrow "A" till closure 1 is completely disengaged with threaded core 17. After this moment the movement of the inside core 19 is stopped, but the ejector continues its movement until the bottom surface 11 of closure 1 passes the top surface of the inside core 19, and the closure can freely fall down. The immovable core 18 is permanently fixed to the mold base and has no movement relative to the base.

Rotation of threaded core 17 effects in linear movement of the closure 1 in the direction of arrow "A". At the same time the ejector 21 moves in the same direction with the same speed, as closure 1, and pushes the skirt 8 over the immovable core 18. Because the speed of the linear movement of closure 1 and bushing 21 is the same, there are no forces acting in the axial direction between the upper part 5 and the skirt 8 which could result in separation of skirt from the upper portion during the ejection. But at the same time a radial force is introduced between the upper portion and the skirt in the area of their frangible connection. As it is shown in FIG. 2 the skirt 8 expands radially outwardly as it is removed from the immovable core 18 by part 22 which forms protrusions 13. Removal of closure 1 from the immovable core 18 in a way, that the upper portion of closure 1 remains straight while the skirt expands outwardly being pushed over conical surface 22 of immovable core 18, would result in fracturing of the frangible connection 12, unless the closure is molded from a very soft, stretchable material and the frangible connection itself is strong enough to expand the upper portion without fracturing, which again has a negative affect on the closure's tamper-evident feature.

To avoid separation between the upper and lower portions of closure 1 during the ejection due to outward expansion of the skirt 8 over the conical surface 22 of an immovable core 18 an undercut 15 is added to the upper portion 5 of the closure 1, above the frangible area 12. During the ejection, when the upper part of skirt 8 expands outwardly, going over the conical surface 22 of immovable core 18, the bottom portion 16 of the upper part 5 of closure 1, located between the frangible area 12 and an undercut 15, expands outwardly too, being pushed over a conical collar 23 of immovable core 18. Because the bottom portion 16 of the upper part and the upper portion of the skirt are moving outwardly together at the same time in the area of frangible connection, it becomes possible to mold the closure 1 in one piece without breaking the frangible connection during its ejection from the mold. Conical collar 23 forms an undercut 15 having a conical cross-section as does the protrusion 13. The conical-cross section of protrusion 13 permits a smooth outward expansion of the skirt during the ejection of closure 1.

After the closure 1 is removed from the immovable core 18, the bottom portion 16 of the upper part 5 springs back, together with the upper portion of the skirt 8, which is shown in FIG. 3. In its further movement the ejector 21 passes the conical surface 22, which forms the protrusion 13. To prevent interference between the conical surface 22 and the ejector 21 during the ejection of the closure 1, the skirt 8 slightly diverges outwardly to provide surface 11 located outside the outer diameter of the conical surface 22.

In case the quality of the thread in the closure is not essential and a cheaper stripped thread can be used to satisfy customers' needs, closure 1 can be stripped off the threaded core 17 by means of inside core 19 and ejector 21 without rotating the threaded core 17. Still the same elements in the closure 1 are needed: undercut 15, conical cross-section of protrusions 13, and outward divergence of skirt 8 to provide ejection of closure 1 from its mold without breaking frangible connection 12.

Thus, closure 1 is applied to the neck 3 of container 2 in a conventional manner. Once so applied, any attempt to remove closure 1 from container 2 must result in fracturing of closure 1 at weakened area 12. Such fracturing will be readily apparent to the user and thus closure 1 is tamper-evident. When it is desired to remove closure 1 from container 2 to gain access to the contents therein one needs only to apply appropriate force in the appropriate direction to turn closure 1. Ratchet elements 9 and 10 cooperate to restrain rotation of skirt portion 8 and continued force to turn closure 1 results in fracturing of weakened area 12 and separation of the upper portion of closure 1 from skirt portion 8. Upper portion of closure 1 may thereafter be screwed onto and off of neck 3 of container 2 to open and close container 2.

Figure 4:
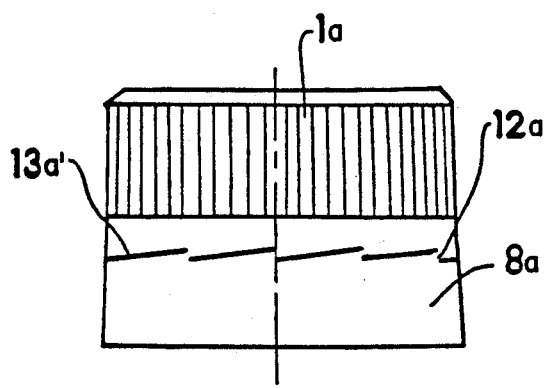
FIG. 4 is an elevational view of another embodiment of tamper-evident closure incorporating the instant invention.
Figure 5:
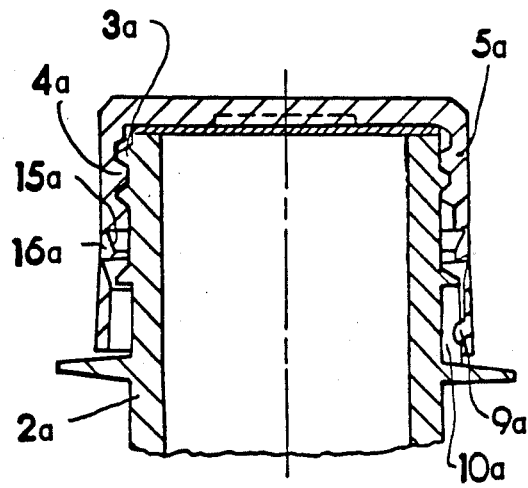
FIG. 5 is an elevational view, in section, of the tamper-evident closure of FIG. 4 as applied to the neck of a container shown in part and in section.

The embodiment of FIGS. 4 and 5 show alternate construction for tamper-evident closure 1a. Closure 1a is formed as was the closure of FIG. 1 by molding from suitable plastic and with internal threads 4a disposed for coaction with external threads 3a formed on the neck of container 2a, formed of plastic or glass and otherwise similar to container 2 of FIG. 1.

Closure 1a also includes a skirt portion 8a formed with internal ratchet elements 9a disposed for coaction with ratchet elements 10a of container 2a in a manner similar to that of the embodiment of FIG. 1.

Closure 1a is also formed with a frangible or weakened area 12a between its upper portion 5a and skirt portion 8a. Such weakened area is formed by a number of protrusions 13a', circumferentially located one after another at an angle "a" to the bottom surface 11a of closure 1a. It should be noted that protrusions 13a' are made in a certain way. Each protrusion starts right under the end of a previous protrusion and on the same level with the beginning of a previous protrusion. The portion of plastic between protrusions 13a' makes the connection between the upper portion 5a of closure 1a and the lower portion 8a thereof frangible.

Similar to closure 1 of FIG. 1, frangible connection 12a of closure 1a is stronger in one direction of rotation and weaker in the opposite direction.

An annular undercut 15a is molded in upper portion 5a above the protrusions 13a' to facilitate ejection of closure 1a from its mold without breaking frangible connection 12a, leaving a strip of material 16a between the undercut 15a and protrusions 13a'. The cross-section of the undercut 15a and protrusions 13a' is similar to the cross section of closure 1 shown in FIG. 1. A side wall of skirt 8a also diverges outwardly to provide an area of bottom surface 11a which is located outside the outer diameter of protrusions 13a" and can be used to facilitate ejection of closure 1a from its mold.

Closure 1a (FIGS. 4 and 5) and container 2a cooperate as described for the embodiment of FIG. 1 such that the application of appropriate force to closure 1a will result in separation of the upper portion of closure 1a from skirt 8a along weakened area 12a. If such separation is not a result of an intended opening of container 2a then it will be evident that there may have been tampering with the contents.

Figure 6:
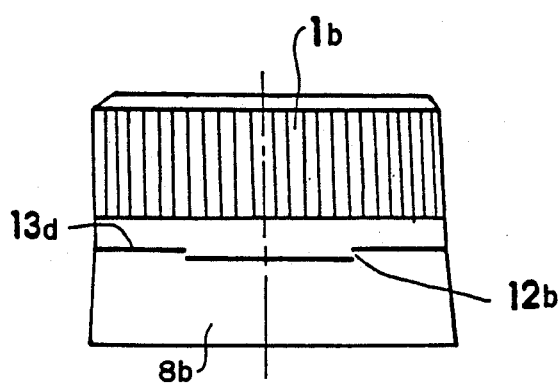
FIG. 6 is an elevational view of another embodiment of tamper-evident closure incorporating the instant invention.
Figure 7:
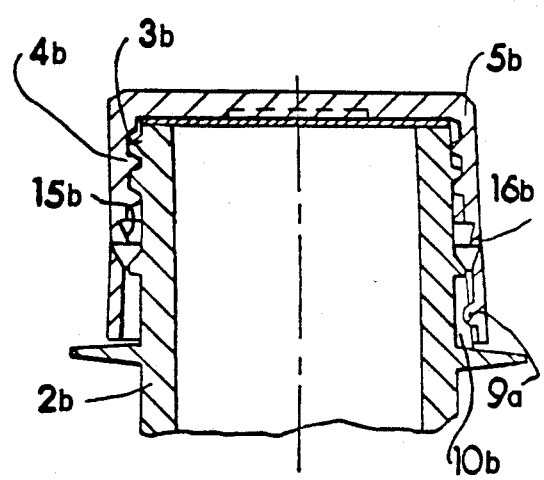
FIG. 7 is an elevational view, in section, of the tamper-evident closure of FIG. 6 as applied to the neck of a container shown in part and in section.

Another embodiment of tamper-evident closure is shown in FIGS. 6 and 7. A closure 1b is shown disposed in cooperation with a container 2b. Both are formed from suitable materials and by molding as hereinabove described. Closure 1b and container 2b include cooperating threads and ratchet elements as well as an annular undercut 15b and protrusions 13d having generally conical cross-sections all cooperating one with the other in a manner and for purposes as previously described.

However, the frangible area 12b is formed otherwise than in previous embodiments. Frangible area 12b is formed during the molding of closure 1b by parallel lines of protrusions 13d which extend through the wall of closure 1b in the area thereof between the upper portion of closure 1b and skirt portion 8b thereof. It should be noted how the protrusions 13d are spaced one from the other and located on two parallel levels with each protrusion starting right under or above a previous one as shown in FIG. 6. The lands 12b between protrusions 13d thus keep lower portion (skirt) 8b and upper portion 5b connected but form weakened or frangible area 12b therebetween. Skirt portion 8b is formed such that it diverges outwardly from its area of connection to the bottom portion of closure 1b. This configuration facilitates the ejecting of closure 1b from its mold without breaking frangible connection 12b.

The application of appropriate force to closure 1b will separate upper portion 5b thereof from skirt 8b along weakened area 12b. The separation of upper portion 5b from skirt 8b will either indicate tampering or will permit desired access to the contents of container 2b.

Figure 8:
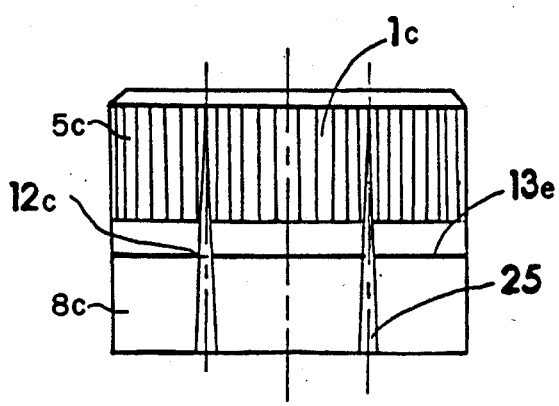
FIG. 8 is an elevational view of another embodiment of tamper-evident closure incorporating the instant invention.
Figure 9:
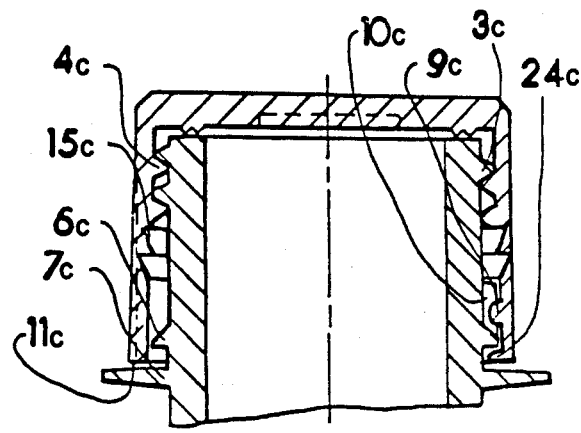
FIG. 9 is an elevational view, in section, of the tamper-evident closure of FIG. 8 as applied to the neck of a container shown in part and in section.

The embodiment of FIGS. 8 and 9 show an alternate construction for a tamper-evident closure 1c. Closure 1c is formed as was closure 1 of FIG. 1 by molding from a suitable plastic and with internal threads 4c disposed for coaction with external threads 3c formed on the neck of container 2c formed of glass or plastic and otherwise similar to container 2 of FIG. 1.

Closure 1c also includes a skirt portion 8c formed with internal ratchet elements 9c disposed for coaction with ratchet elements 10c of container 2c in a manner similar to that of the embodiment of FIG. 1. A rib 24 is formed within and proximate to the bottom of skirt 8c that cooperates with an annular collar 6c formed on container 2c. A lower collar 7c is also formed on the neck of container 2c.

Closure 1c is also formed with a frangible or weakened area 12c between its upper portion 5c and skirt 8c. Such weakened area is formed by a continuous protrusion 13e which would separate skirt 8c from the upper portion 5c of closure 1c except for a plurality of vertically extending ribs 25 which are formed during the molding of closure 1c on the outer surface thereof and so as to extend down its upper portion and skirt 8c as shown. A bottom surface 11c of ribs 25 is used for ejection of a closure 1c from its mold without breaking frangible connection 12c.

A conical cross-section of protrusion 13e combined with a conical cross-section of undercut 15c and bottom surface 11c insures ejection of closure 1c from its mold in one piece.

It will thus be seen that the cooperation of rib 24 with collars 6c and 7c prevents closure 1c from being pryed up; and otherwise cooperate through ratchet elements 9c and 10c and weakened area 12c to provide a tamper-evident closure. The application of force to turn closure 1c through the cooperation of ratchet elements 9c and 10c will fracture ribs 25 proximate protrusion 13e and readily indicate tampering unless, of course, such action was intended in order to gain access to the contents of container 2c.

Figure 10:
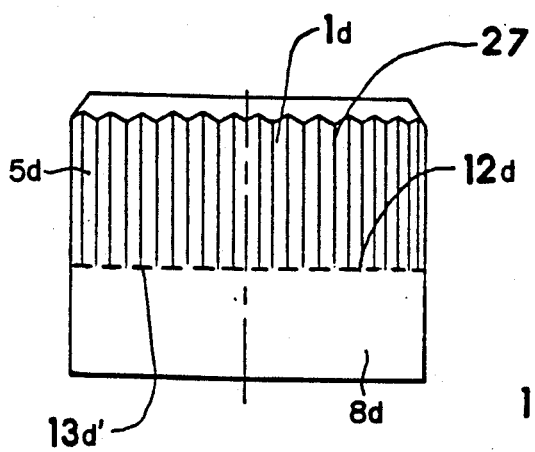
FIG. 10 is an elevational view of another embodiment of tamper-evident closure incorporating the instant invention.
Figure 11:
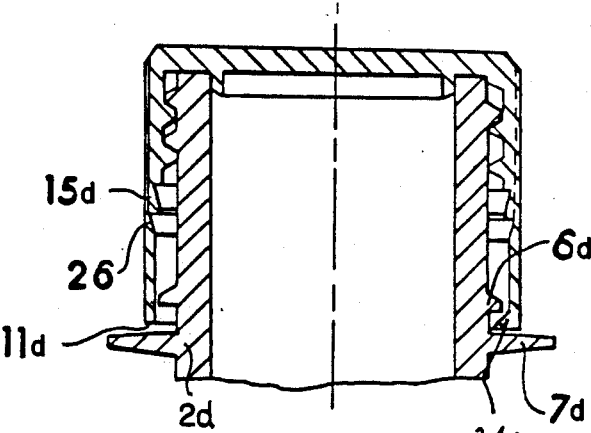
FIG. 11 is an elevational view, in section, of the tamper-evident closure of FIG. 10 applied to the neck of a container shown in part and in section.

In the embodiment of FIGS. 10 and 11 a closure 1d is shown disposed for coaction with a container 2d identical in construction and configuration to container 2 of FIG. 1. It should be noted that container 2d includes spaced annular collars 6d and 7d.

Closure 1d is molded from suitable plastic with internal threads formed for cooperation with external threads formed on the neck of container 2d and with a number of ribs 24d formed for cooperation with annular collar 6d formed around the neck of container 2d. The ribs 24d prevent from taking off the closure 1d from a container 2d without breaking frangible connection 12d between upper part 5d and the skirt 8d. An undercut 15d is molded in the upper portion of closure 1d to prevent from breaking of frangible connection 12d during the ejection in a manner and for purposes as previously described.

The frangible connection, however, is formed differently. An annular undercut 26, having a conical cross-section as does undercut 15d, located right above the undercut 26, intersects with external serrations 27 formed around the outer surface of an upper portion of closure 1d, forming protrusions 13d' and frangible connections 12d. Because the outside diameter of serrations 27 is bigger than the outside diameter of undercut 26 there is no need to diverge skirt 8d outwardly. Portion 11d of the bottom surface located outside the outer diameter of undercut 26 can be used to eject closure 1d from its mold.

Closure 1d and container 2d cooperate as described for the embodiment of FIG. 1 such that the application of appropriate force to closure 1d will result in separation of the upper portion of closure 1d from skirt 8d along weakened area 12d. If such separation is not a result of an intended opening of a container 2d it will be evident that there may have been tampering with the container.

Figure 12:
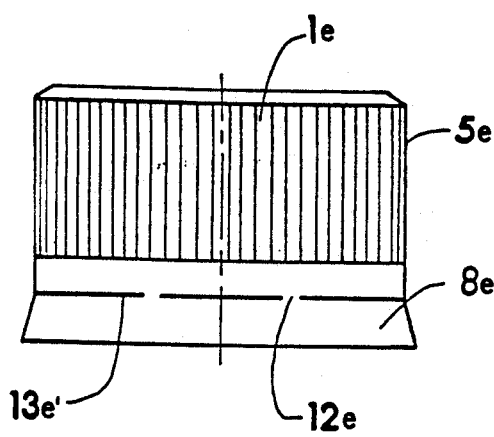
FIG. 12 is an elevational view of another embodiment of tamper-evident closure incorporating the instant invention.
Figure 13:
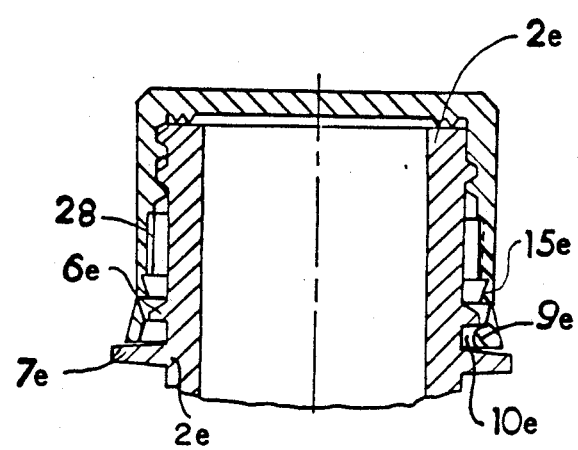
FIG. 13 is an elevational view, in section, of the tamper-evident closure of FIG. 12 applied to the neck of a container shown in part and in section.

In the embodiment of FIGS. 12 and 13 there is shown a closure 1e disposed for cooperation with a container 2e. Closure 1e and container 2e are formed in a manner and from materials as previously described.

Closure 1e includes an upper or cap portion 5e and a lower or skirt portion 8e attached one to the other by a weakened or frangible area 12e formed by a plurality of protrusions 13e'. The protrusions are aligned but intermittent and formed from the inside of closure 1e, as is the annular undercut 15e, during the molding thereof as described for the previous embodiments.

A plurality of ratchets 9e are formed proximate the bottom of skirt 8e for cooperation with ratchets 10e and annular collars 6e and 7e formed around the neck of container 2e to hinder prying up closure 1e. Closure 1e also includes internally formed screw threads disposed for cooperation with screw threads formed around the neck of container 2e.

A number of ribs 28 are formed within closure 1e between the screw threads formed therewithin and skirt 8e. Ribs 28 are used to prevent closure 1e from rotation when unscrewing of closure takes place in the molding process.

Figure 14:
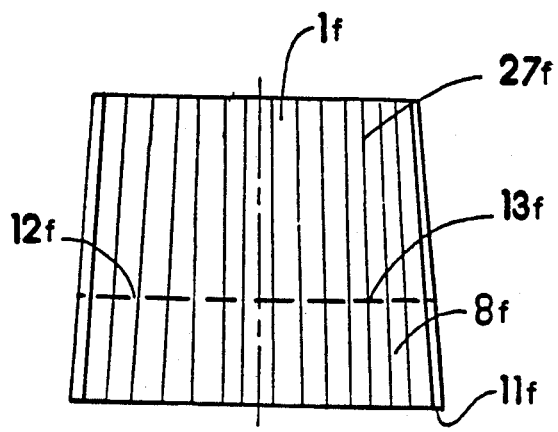
FIG. 14 is an elevational view of another embodiment of tamper-evident closure incorporating the instant invention.
Figure 15:
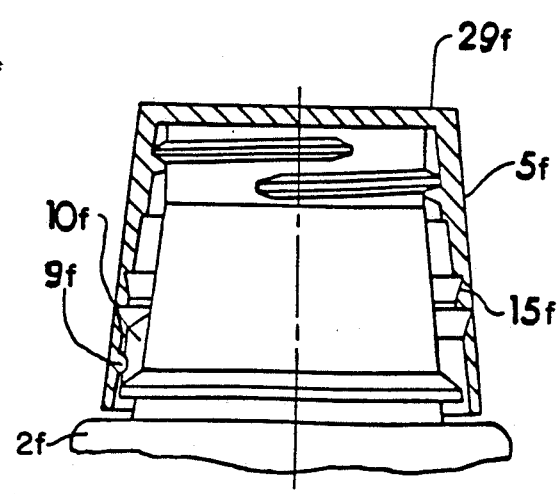
FIG. 15 is an elevational view, in section, of the tamper-evident closure of FIG. 14 applied to the neck of a container shown in part and in section.

In the embodiment shown in FIGS. 14 and 15 closure 1f is shown disposed for cooperation with a container 2f. Closure 1f and container 2f are formed in a manner and from materials as previously described. Closure 1f and container 2f include cooperating threads and ratchet elements as well as annular undercuts 15f and protrusions 13f all cooperating with each other in a manner and for purposes as previously described.

Closure 1f, however, is formed such that it diverges outwardly from top 29 of its upper or cap portion 5f to bottom 11f of its lower or skirt portion 8f. A weakened or frangible area 12f is provided between cap 5f and skirt 8f by molding protrusions 13f in the inside surface of closure 1f. The divergent configuration of closure 1f from its top 29 to its bottom 11f provides a part of the bottom surface located outside the outer diameter of protrusions 13f. This portion can be used to faciliate the ejection of the closure from its mold.

The outer surface of closure 1f is molded such that it forms a plurality of serrations 27f therein. Serrations 27f are not, however, cut completely by protrusions 13f but the wall of closure 1f between serrations 27f is cut through by protrusions 13f. Thus, the remaining portions of serrations 27f in frangible area hold cap 5f and skirt 8f together.

Ratchets 10f formed on container 2f and 9f formed within skirt 8f of closure 1f are used to restrain rotation of skirt 8f. This will require the use of a predetermined degree of force to turn closure 1f resulting in severance of cap 5f from skirt 8f along frangible area.

Another embodiment of a tamper-evident closure is shown in FIGS. 16 and 17. A closure 1g is shown disposed in cooperation with a container 2g. Both are formed from suitable materials and by molding as hereinabove described. Closure 1g and container 2g include cooperating threads and ratchet elements as well as annular collars all cooperating one with the other in a manner and for purposes as previously described.

Closure 1g, however, includes an undercut 13g that is formed within closure 1g so as to leave a wall thickness proximate undercut 13g of between 0.004 inches and 0.008 inches. This creates a weakened or frangible area between an upper portion 5g of closure 1g and lower portion or skirt 8g thereof.

Skirt 8g diverges outwardly from weakened area 12g to form a bottom surface 11g located outside an outer diameter of undercut 13g to facilitate ejecting of the closure 1g from its mold.

A tab 30 is formed on skirt 8g to extend therefrom as shown. A groove 31 extends from undercut 13g to bottom 11g of skirt 8g proximate tab 30. Ratchets 9g are formed within skirt 8g as and for the hereinabove described reasons.

Tab 30 and groove 31 cooperate to facilitate intended separation of skirt 8g from the upper portion of closure 1g. This is accomplished by applying appropriate force to tab 30 to separate skirt 8g along weakened area 12g. The separation of skirt 8g from the upper portion of closure 1g will evidence tampering or possible tampering.

The frangible area shown on FIGS. 16 and 17 is much stronger than the one shown in previous embodiments, therefore, there is no need to provide the upper portion with an additional undercut 15 to prevent separation of upper and lower parts during the ejection, as it is shown in the embodiment of FIG. 1.

However, the ratchet elements 9g should be made larger than the ones needed in the previous embodiments to prevent them from being smashed before the frangible connection 12g breaks.

The embodiment of FIGS. 18 and 19 shows a closure 1h disposed for cooperation with a container 2h. Container 2h is formed and constructed similarly to the containers of the previously described embodiments; and so is closure 1h. The weakened or frangible area of closure 1h and the way the closure gets affixed to the container 2h are, however, different.

Closure 1h is formed with a skirt or lower portion 8h and with an upper portion 5h which come together at a weakened or frangible area 12h. Skirt 8h has an outside diameter that is larger than the outside diameter of the upper portion 5h; skirt 8h is formed in such a way that the size of the inside diameter is close to the size of the outside diameter of upper portion 5h. Thus where upper portion 5h meets skirt 8h there are only very small bridges of material left to hold them together.

In addition, a number of external grooves 32 are formed on the upper portion 5h of the closure 1h so as to extend down to the weakened area 12h. Grooves 32 are made to form an upper surface of several ribs 33 located on the inner surface of the skirt 8h and used to affix the skirt 8h to the annular collar 6h of the container 2h. In addition, an annular collar 7h is provided to prevent closure 1h from being readily pried up off of container 2h.

The application of appropriate force to closure 1h will separate upper portion 5h thereof from skirt 8h along weakened area 12h. The separation of upper portion 5h from skirt 8h will either indicate tampering or will permit desired access to the contents of container 2h.

The cross-section of the grooves 32 formed in the outer surface of the cap 5h can be of various shapes. The top projection of the ribs 33 formed on the inside surface of the skirt 8h and located under the grooves 32 will automatically acquire the same shape. By making the cross-section of the grooves in the upper cap portion triangular, the ribs 33 will, too, have a triangular top projection. With a triangular top projection ribs 33 can perform a dual function. They can be affixed to the annular collar of the container after the closure is screwed on to the container and thus prevent the skirt from axial movement relative to the container's neck. If the neck of a container is also provided with ratchets formed under the annular collar, the ribs 33 would engage with ratchets on the container's neck and prevent the rotation of the skirt 8h relative to the container's neck after the closure is applied to the container.

FIGS. 20 and 21 are included to facilitate an understanding of how the closure of FIGS. 18 and 19 might be molded. A cavity 35 forms the outside surface of upper portion 5h of closure 1h and the top surface of ribs 33. The inside surface of cavity 35 has a number of ribs 36 along the cavity from top to bottom and extend beyond the parting line forming a number of legs that stick out of the cavity. The skirt portion of closure 1h is molded under the parting line by bushing 37 which forms the inside of skirt portion 8h; bushing 38 which forms the outside of skirt 8h; and the ejector 39 which forms the bottom of the skirt 8h.

Bushing 37 has a number of grooves which are equal to the number of ribs 36 of the cavity 35. During the closing of the mold, the legs which are the continuation of ribs 36 enter the grooves of bushing 37. That leaves a space between the bottom surface of the grooves in bushing 37 and the end surface 40 of ribs 36 which forms the rib 33 on the inner surface of the skirt 8h of closure 1h. Thus, ribs 36 form the top surface 34 of ribs 33 and protrusions 41 in the frangible connection 12h.

The arrangement of elements of closure 1h, shown in FIGS. 18 and 19, permits to form the upper surface of ribs 33 in such a way that they provide the best possible grip between skirt 8h and the bottle neck. That in turn, makes it very difficult to tamper with the container and improves its tamper-evident feature dramatically.

FIG. 21 shows a closure 1h on a threaded core 42 which forms the inside of closure 1h. It can be unscrewed from the core by an outside unscrewing device or taken off the core by any other method known to the industry.

The embodiment shown in FIGS. 22 and 22A shows a child-resistant tamper-evident closure 1i.

Figure 23:
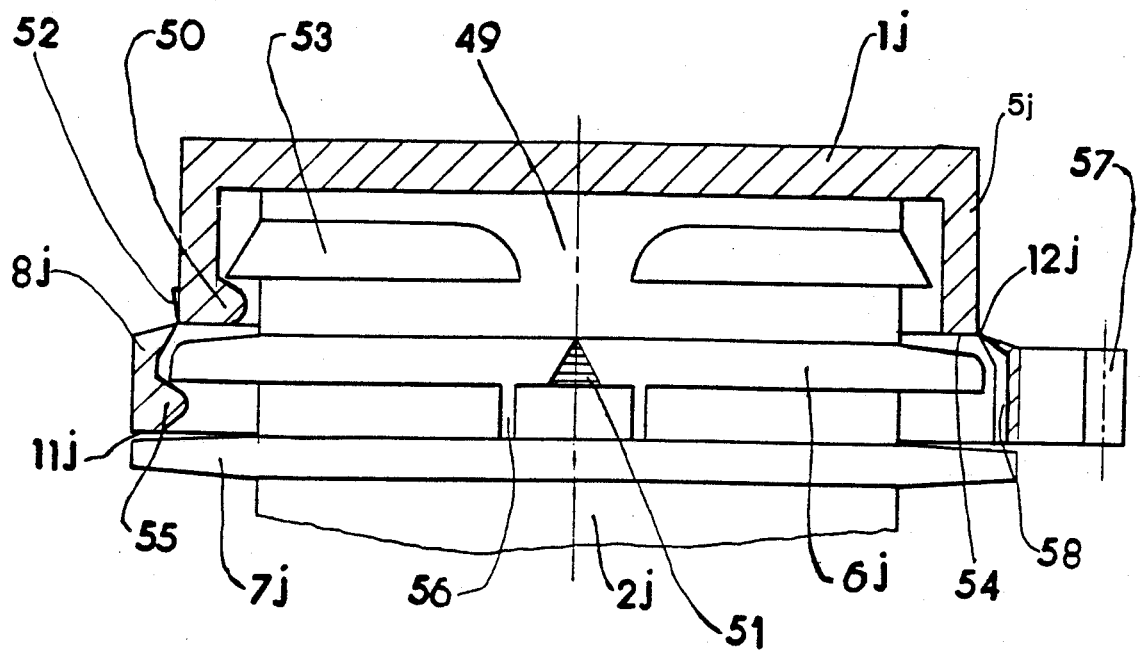
FIG. 23 is a view, in section, of a tamper-evident, child-resistant closure, incorporating the instant invention.

Closure 1i includes an inside cap 43 and outside cap 44; both are separately molded parts. The inside cap 43 is sized to fit within the outside cap 44 and to be retained therewithin by a collar 45 molded within the cap 44. To unscrew the cap off the container, a considerable downward force should be applied to the outside cap to keep the outside and inside caps engaged during unscrewing; thus, rendering the closure child-resistant. One of the ways to do so is shown in FIGS. 22 and 23.

The outside cap 44 includes an internally formed rib 46 while the inside cap 43 includes a groove 47 disposed for cooperation therewith. The rib 46 and grooves 47 are formed as shown in FIG. 22A with cooperating straight sides and cooperating curved sides. The cap is child-resistant since in order to unscrew it a considerable force should be applied to the outside cap to keep both outside cap and inside cap engaged while the container is being opened. Only such force would keep the parts engaged through the rib 46 and the groove 47;

otherwise the curve 48 formed on the left side of the rib 46 would slide over the groove 47 and cause the disengagement between the upper and the lower portions of the cap.

The tamper-evident construction for closure 1i is accomplished by forming a frangible or weakened connection 12i between skirt 8i and upper portion 5i of an outside cap 44. This can be done by one of the methods shown in previously described embodiments. As shown in FIG. 22, the skirt 8i is formed with internal ratchet elements 9i disposed for cooperation with ratchet elements 10i formed on the container's neck. Any attempt to remove the closure 1i from the container 2i must result in fracturing of the outside cap 44 at the weakened or frangible area 12i. Such fracturing will be readily apparent to the user, thus making the closure 1i tamper-evident. When it is desired to remove the closure 1i from the container 2i to gain access to the contents, one needs only to apply an appropriate force in the appropriate direction to turn the outside cap 44. The ratchet elements 9i and 10i cooperate to restrain the rotation of the skirt portion 8i. A continued application of force to turn the outside cap 44 will result in fracturing of the weakened area 12i and separation of the upper part 5i of the outside cap 44 from the skirt portion 8i. The upper portion of the outside cap 44 together with the inside threaded cap 43 may be thereafter be used as a regular child-resistant closure.

The embodiment shown in FIG. 23 shows a closure 1j as a tamper-evident child-resistant push-on type closure. Closure 1j includes an upper portion 5j, which is a regular child-resistant cap, and a lower skirt portion 8j. Skirt 8j is connected to the upper cap 5j by a weakened or frangible area 12j, a relatively thin membrane formed during the molding of closure 1j in such a way as to provide a tamper-evident construction for closure 1j.

Container 2j is formed of suitable materials in such a way as to provide a child-resistant construction that will cooperate with a child-resistant construction of the upper portion 5j of the closure 1j. The neck of the container 2j is provided with a collar 53 that has a gap 49. The upper portion 5j of the closure 1j is molded with a number of undercuts, all of which but one are too large to pass through the gap 49 and a small undercut 50 which is sized to pass through the gap 49. An arrow 51 is formed on the outside surface of the neck of the container 2j to indicate the location of the gap 49, while arrow 52 is formed on the upper portion of the closure 1j to indicate the location of the undercut 50. Only when both arrows are aligned, which means that the small undercut is located under the gap, the upper portion 5j of the closure 1j can be removed from the container 2j. This construction makes the upper portion 5j of the closure 1j child-resistant.

An annular collar 6j larger than collar 53 is added to the container neck. The collar 6j cooperates with the bottom surface 54 of the closure 1j to prevent it from being pried off.

A skirt 8j is added to the upper portion 5j to render the closure 1j tamper-evident. The skirt 8j of the closure 1j is formed with one or several undercuts 55 that cooperate with the bottom surface of the collar 6j and make it difficult to pry the closure 1j off the container 2j without breaking the frangible connection 12j. In addition, the skirt 8j covers the arrow 51 so as to obscure it and hinder the alignment of the gap 49 with the small undercut 50. However, should the gap 49 and the small undercut 50 accidentally align, the cooperation of the undercut 55 with the collar 6j will prevent prying the closure 1j off the container 2j. This is accomplished by aligning one of the undercuts 55 with the small undercut 50. However, to make the tamper-evident closure 1j even more reliable, a number of ribs 56, one at least, can be formed between annular collars 6j and 7j under the gap 49. The cooperation between the undercut 55, which is aligned with the small undercut 50, and the ribs 56 will prevent the alignment between the small undercut 50 and gap 49. A collar 7j is formed on the container 2j to cooperate with the bottom surface 11j of the skirt 8j. This cooperation hinders prying the closure 1j off the container 2j. A pull tab 57 is formed to extend out from the skirt 8j; and a groove 58 is formed proximate to the tab 57 to facilitate breaking of the skirt 8j.

When it is desired to obtain access to the contents of the container 2j, one needs only to pull the tab 57 with a force sufficient to fracture the weakened area 12j and separate the skirt 8j from the upper portion 5j. Thereafter, the alignment of the arrows 51 and 52 will permit the removal of the upper portion 5j of the closure 1j from the container 2j. If the skirt 8j is removed, or if the weakened area 12j has been fractured, the user would become alert to the possibility of the tampering.

Figure 24:
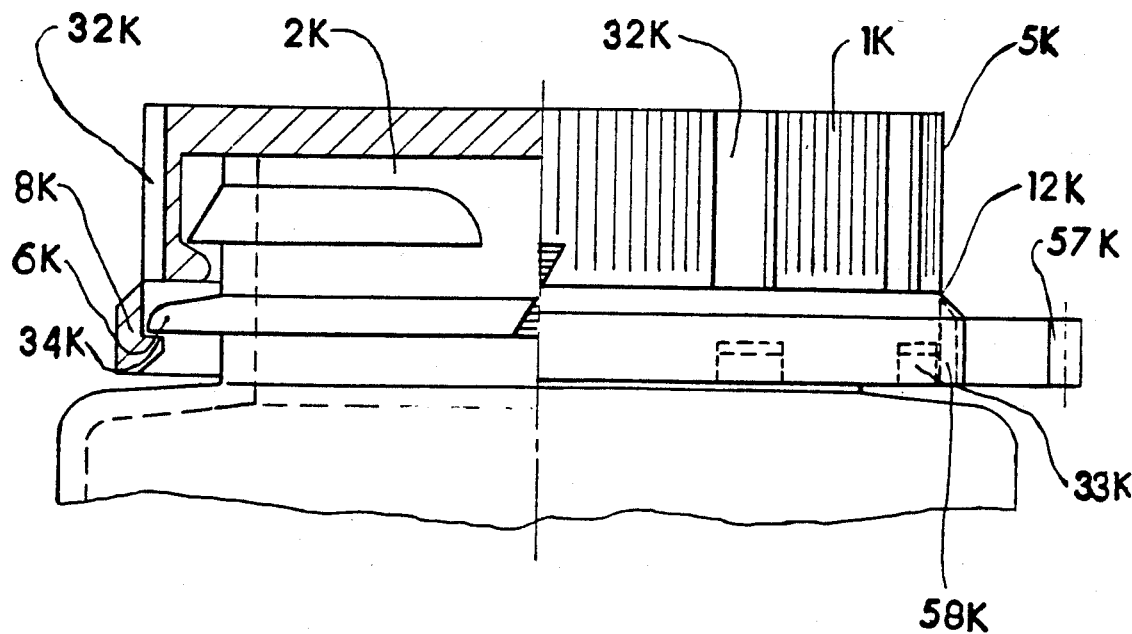
FIG. 24 is a view, in partial section, of a tamper-evident, child-resistant closure, incorporating the instant invention.

The embodiment in FIG. 24 show another child-resistant tamper-evident push-on closure 1k similar in many respects to the embodiments in FIG. 23. The closure 1k and container 2k are formed of the same materials and in the same manner as those described previously. However, the tamper-evident features and frangible area of closure 1k are formed differently. A number of grooves 32k are formed on the outside surface of the upper portion 5k of the closure 1k. Similarly to the embodiments in FIGS. 18 and 19, the grooves 32k are made to form an upper surface 34k of the several ribs 33k formed in the inside surface of the skirt 8k and used to affix the skirt 8k to the annular collar 6k of the container 2k.

The upper portion 5k and the skirt 8k are attached to each other by a weakened or frangible area 12k made of a relatively thin membrane formed during the molding of the closure 1k. The frangible membrane 12k is protruded in several places under the grooves 32k and above the ribs 33k; this makes the connection intermittent and therefore more fragile.

The presence of the grooves 32k makes it possible to form the upper surface 34k of the ribs 33k on the parting line. This, in turn, enables the closure 1k to be ejected from its mold without distorting the upper surface 34k. This leaves the surface 34k in the best possible form and insures a good grip between the ribs 33k of the skirt 8k and the annular collar 6k of the container 2k. The molding of the grooves 32k and the ribs 33k is similar to the molding of the elements shown in FIGS. 20 and 21.

A pull tab 57k extending from the skirt 8k and a groove 58k formed proximate to the pull tab 57k facilitate breaking of the skirt 8k along the groove 58k and fracturing the weakened area 12k and separation of the skirt 8k from the upper portion 5k.

Thus, closure 1k is pushed onto the container 2k in a conventional manner. Once so applied, any attempt to remove the closure 1k from the container 2k will result in cooperation between the top surface 34k of the ribs 33k with the bottom surface of the annular collar 6k which must result in fracturing of the closure 1k at the weakened area 12k. Such fracturing will be readily apparent to the user and thus closure 1k is tamper-evident. When it is desired to remove the closure 1k from the container 2k to gain access to the contents therebetween, one needs only to pull the tab 57k with sufficient force and separate the skirt 8k from the upper portion 5k.

Thus, as long as the skirt 8k is connected to the upper portion 5k it is most probable that the contents of the container 2k have not been tampered with. On the other hand, if the skirt 8k has not been intentionally removed, or if the weakened area 12k is fractured, there is evidence of possible tampering.

Figure 25:
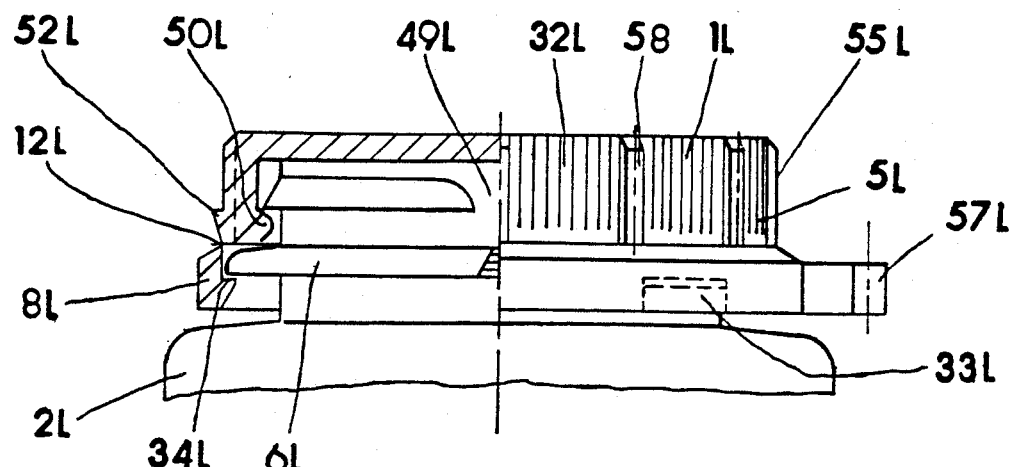
FIG. 25 is a view, in partial section of a tamper-evident, child-resistant closure, incorporating the instant invention.
Figure 26:
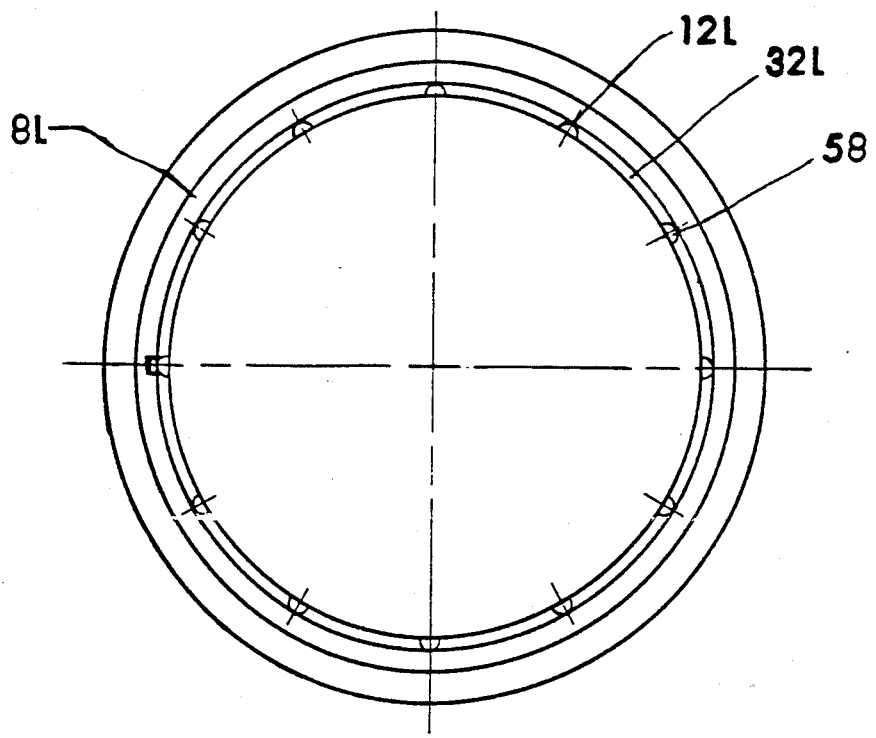
FIG. 26 is a top view of the closure shown in FIG. 25.

The embodiment in FIGS. 25 and 26 shows a child-resistant, tamper-evident, push-on type closure 1L which is similar to the closure shown in FIG. 24. However, to avoid an additional wall thickness in the upper cap portion 5L, a number of grooves 58 are formed on the outer surface of the upper cap portion 5L. A number of openings 32L are formed in between ribs 58, similarly to the grooves 32k shown in FIG. 24 and to the grooves 32h shown in FIGS. 18 and 19, but much wider, to provide means of forming an upper surface 34L of the ribs 33L on the lower skirt portion 8L and used to affix the skirt 8L to the container's neck.

Figure 27:
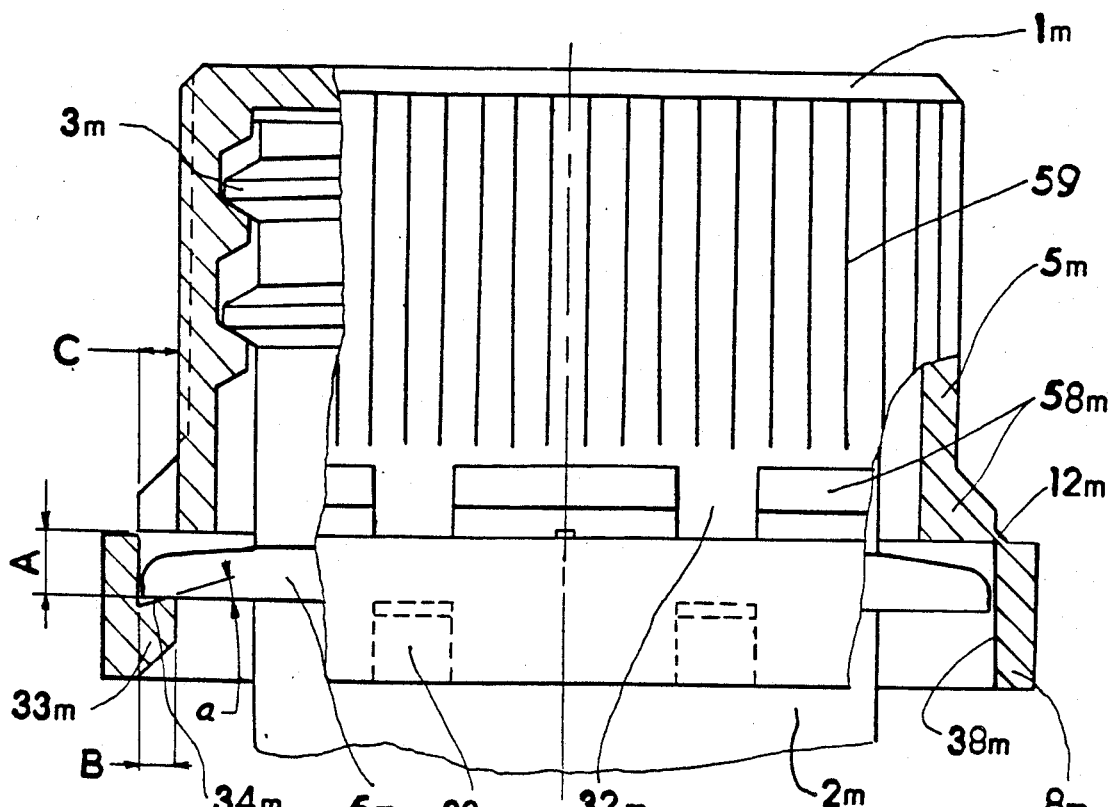
FIG. 27 is a view, in partial section, of a tamper-evident closure, incorporating the instant invention.
Figure 28:
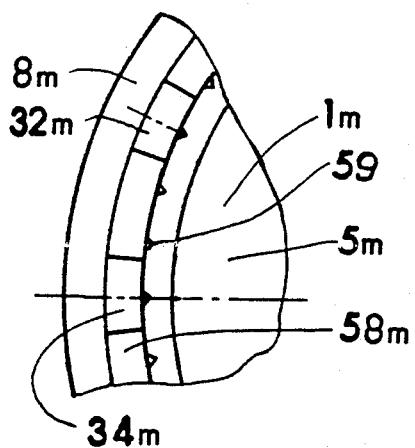
FIG. 28 is a top view of the closure shown in FIG. 27.

The embodiment of FIGS. 27 and 28 shows a closure 1m disposed for cooperation with a container 2m. Closure 1m is similar to the closure shown in FIG. 18. The only difference between these closures is that an excessive amount of material formed on the top cap portion 5h of closure 1h in between grooves 32 is mostly removed leaving an area of an increased thickness of material forming an annular collar 58m at the bottom end of an upper cap portion 5m. With the removal of that excessive material from upper cap portion 5m, the grooves 32 themselves will disappear above the annular collar 58m leaving just short openings 32m formed in the area of increased thickness 58m.

Container 2m is of conventional configuration with a threaded neck portion 3m having an annular collar 6m formed under threaded neck portion.

Closure 1m includes an upper threaded portion 5m and a lower skirt portion 8m attached to one another through a number of thin strips of material 12m making the connection frangible.

The external surface of the upper cap portion 5m of the closure 1m has a number of uniformly disposed one from another peripherally located ribs 59 formed above the annular collar 58m by means of which it may be gripped to facilitate screwing and unscrewing.

The lower skirt portion 8m is formed with its inner diameter located at a close distance from an outside diameter of an annular collar 58m formed at the bottom of an upper cap portion.

A number of ribs 33m are formed on the inside surface 38m of a lower skirt portion 8m to provide means of engagement between the skirt and the container annular collar 6m. The top surface 34m of ribs 33m is spaced from the top of the skirt by a distance "A" to provide room for an annular collar 6m located under the upper cap portion. Ribs 33m are peripherally spaced one from another and located directly under the openings 32m formed in the annular collar 58m at the bottom of an upper cap portion. The top surface 34m (see FIG. 28) of ribs 33m is formed as a top projection of openings 32m and can be arranged either parallel to or at a small positive angle "a" to the bottom surface of a container annular collar 6m. This position also can be described as being perpendicular to or at an angle equal (90−"a") degrees to the inner wall of a lower skirt portion. This arrangement provides reliable engagement between the ribs 33m and container annular collar 6m and improves the tamper-resistant feature of the closure. In addition, the present invention allows even further improvement of closure tamper-resistant capabilities by increasing the interference between the outside diameter of the container annular collar 6m and the ribs 33m which depends on the thickness "B" of the ribs 33m. Thickness "B" can be either equal to or close to the size "C" which designates the depth of the openings 32m. Size "C" is determined by the thickness of the annular collar 58 formed at the bottom end of an upper cap portion 5m.

Thus, closure 1m is applied to the neck of a container 2m in a conventional manner. Once so applied, ribs 33m formed on skirt 8m are engaged with the bottom surface of an annular collar 6m formed on a container neck, and any attempt to remove closure 1m from container 2m must result in fracturing of closure 1m at weakened area 12m. Such fracturing will be readily apparent to the user and thus closure 1m is tamper-evident.

Forming an annular collar 58m at the bottom of an upper cap portion 5m, forming openings 32m in the collar 58m; positioning ribs 33m directly under openings 32m and forming the ribs 33m at a distance from the top end of a skirt 8m, makes it possible to mold an upper surface 34m of ribs 33m at a positive angle and at the same time to increase the ribs thickness "B" which substantially increases interference between the ribs 33m and bottle annular collar 6m. Both increased interference and positive angle provide a closure with much better tamper-resistant capability than any presently known tamper-evident closures.

Figure 29:
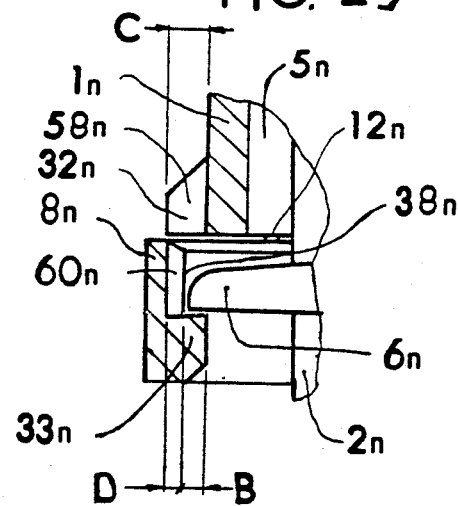
FIG. 29 is a view, in partial section, of another embodiment of a tamper-evident closure, incorporating the instant invention.

The embodiment of FIG. 29 shows an alternate construction for tamper-evident closure 1n. Closure 1n is formed as was the closure of FIGS. 27 and 28 by molding from suitable plastic and with internal threads disposed for coaction with external threads formed on the neck of container 2n. Closure 1n also includes a skirt portion 8n formed with internal rib elements 33n disposed for coaction with container annular collar 6n.

Closure 1n is also formed with a frangible or weakened connection between the upper cap portion 5n and skirt portion 8n.

However, the position between the outer diameter of an annular collar 58n formed at the bottom end of an upper cap portion with respect to an inside diameter 38n of a lower skirt portion 8n, is different. The size of an inner diameter 38n of a lower skirt portion 8n is smaller than that of an outer diameter of an annular collar 58n by a small amount "2D". The outer diameter of the lower skirt portion 8n remains larger than the outer diameter of an annular collar 58n. Such an arrangement leads to the formation of grooves 60n on an inner surface 38n of a skirt 8n. The depth "D" of each groove plus thickness "B" of ribs 33n is equal to depth "C" of openings 32n formed in the annular collar 58n at the bottom end of an upper cap portion.

Despite the fact that depth "B" of ribs 33n is smaller than the depth "C" of openings 32n by depth "D" of grooves 60n, this arrangement has an advantage over the embodiment shown in FIGS. 27 and 28 in its tamper-resistant capabilities. The advantage comes from the fact that in closure 1n not only the lower skirt portion 8n is engaged with the container annular collar 6n by ribs 33n, but at the same time it is locked in place by the upper cap portion 5n because its outside diameter is larger than the inside diameter of a lower skirt portion. In a case of an attempted tampering when one tries to open the container without breaking the frangible connection between the upper and lower portions of closure 1n by spreading the ribs 33n outwardly over the container annular collar 6n, it will be still impossible to take the closure off the container without breaking the frangible connection because the upper cap portion will prevent the upward movement of a lower skirt portion due to its larger outer diameter in comparison with skirt inner diameter.

Figure 30:
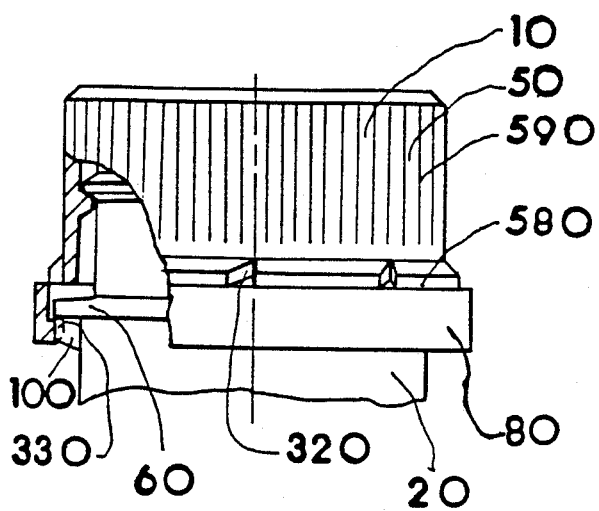
FIG. 30 is an elevational view in partial section of a tamper-evident closure incorporating the present invention.
Figure 31:
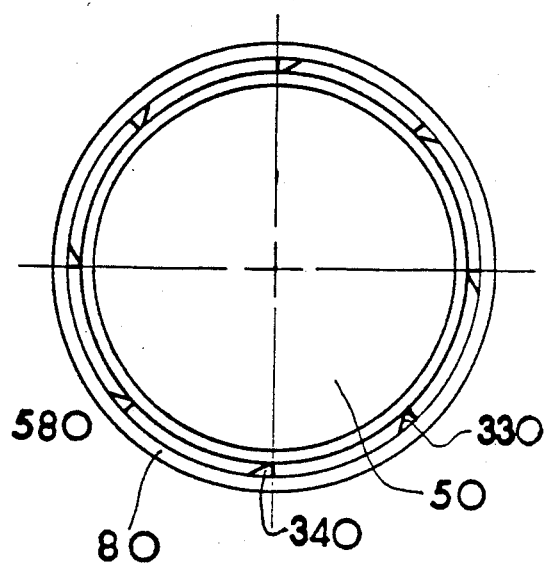
FIG. 31 is a top view of the closure shown in FIG. 30.

The embodiment of FIGS. 30 and 31 shows a closure 1o disposed for cooperation with a container 2o. Container 2o is formed and constructed similarly to the previously described embodiments with an addition of a number of ratchets 10o formed under an annular collar 6o. Closure 1o is formed similarly to the closure 1m shown in FIGS. 27 and 28. However, the top projection of the openings 32o and, as a result, the top surface 34o of the ribs 33o are formed differently.

In the closure 1o openings 32o formed in the thickened area at the bottom end of an upper cap portion have a triangular top projection, which renders an opportunity to form the ribs 33o on the inside surface of the skirt 8o with a triangular top surface 34o. Triangular top projections of the ribs allows them to perform as ratchets and be disposed for cooperation with ratchets 10o of container 2o. Ratchet-rib elements 33o and ratchets 10o cooperate in a well-known manner to permit rotation of closure 1o in one direction but prevent the rotation of closure 1o in the opposite direction as long as the lower skirt portion 8o is intact and in place. In addition, the ratchet-rib elements 33o are spaced from the upper cap portion to provide room for the container annular collar 6o. The top surface of ratchet-rib elements 33o is formed at a small positive angle to the bottom surface of container annular collar 6o and have sufficient depth "B" guaranteed by a sufficient thickness "C" of the annular collar 58o formed at the bottom end of an upper cap portion 5o, which provides a reliable grip between the container annular collar 6o and the ratchet-rib elements 33o and prevents an axial movement between the lower skirt portion and container neck.

After closure 1o is applied to container 2o in a conventional manner the ratchet-rib elements 33o are engaged with the lower surface of container annular collar 6o formed on container neck and at the same time with ratchets 10o formed under annular collar. Such engagement prevents both rotational and axial movement between the lower skirt portion and container neck providing a double protection from tampering.

Figure 32:
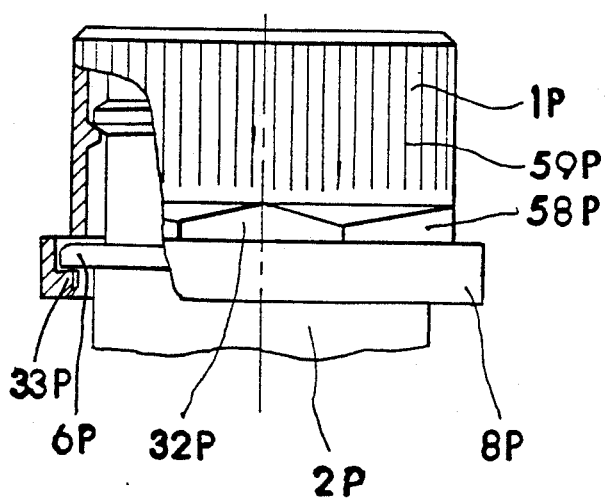
FIG. 32 is an elevational view in partial section of tamper-evident closure incorporating the instant invention.
Figure 33:
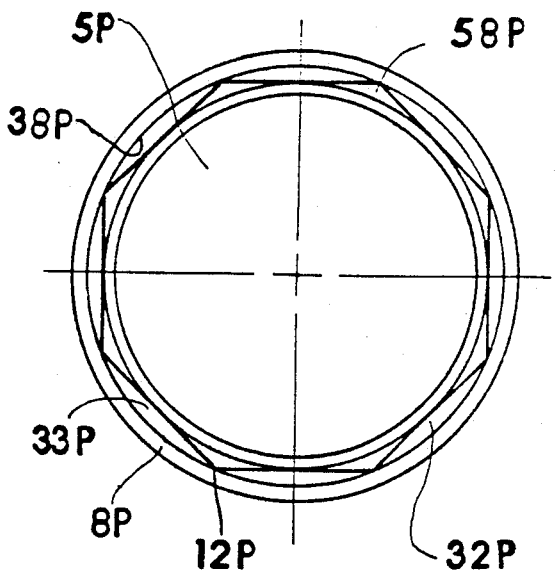
FIG. 33 is a top view of a closure, shown in FIG. 32.

The embodiment of FIGS. 32 and 33 shows an alternate construction for tamper-evident closure 1p. Closure 1p is formed as was the closure of FIG. 27, with the upper cap portion having a thickened area of material located at the bottom, and a lower skirt portion attached to the upper cap by a number of thin strips of material, which makes the connection frangible, and having a number of ribs 33p formed on its inner surface for engagement with the container annular collar.

However, the thickened area 58p at the bottom end of the cap and the top projection of the ribs 33p are formed differently. The thickened area at the bottom end of an upper cap portion is formed with its top projection having a shape of a regular n-sided polygon enveloping the outside diameter of the upper cap portion 5p. The inside diameter 38p of the lower skirt portion 8p is formed in close proximity to the thickened area 58p and is connected to the upper cap portion by a number of thin strips of material 12p, thus making the connection frangible. Such combination between the outside contour of a thickened area 58p and the inside diameter 38p of the inner skirt portion 8p forms "n" openings 32p with a top projection of a circular segment outlined by an inner diameter of said skirt and a chord formed by a side of a regular polygon. The openings 32p shown in FIGS. 32 and 33 and outlined between the sides of a regular polygon and arcs formed by the inside diameter of a lower skirt portion are used to form the top surface of ribs 33p located under the openings 32p, formed on the skirt 8p.

After the closure 1p is screwed onto container neck the ribs 33p are engaged with the container annular collar 6p and the closure can not be taken off the container without breaking frangible connections 12p, thus rendering the closure tamper-evident.

FIG. 34 shows how the present invention can be utilized to form a child-resistant tamper-evident closure.

Closure 1q includes an inside cap 43q and an outside cap 44q; both are separately molded parts. The inside cap 43q is sized to fit within the outside cap 44q and to retain there within by a collar 45q molded on the inner surface of the cap 44q. To unscrew the cap off the container, a considerable force should be applied in a direction different from the unscrewing moment to the outside cap to keep the outside and inside caps engaged during unscrewing. A number of specially formed elements like ratchets 43q, are formed on the inside surface of a cap 44q and the outside surface of an inner cap 43q to keep them engaged during the unscrewing by an additional force applied in the downward direction thus, rendering the closure child-resistant.

The tamper-evident construction of closure 1q is accomplished by forming the outside cap 44q in the same manner as in closures described in FIGS. 18, 19 and 27-33. However, the inside thread of the outer cap 44q is replaced by elements needed to retain the inside cap 43q within the outside cap 44q and elements needed to keep them engaged during screwing closure onto the container and unscrewing it off the container.

The outside cap 44q shown in FIG. 34 consists of an upper cap portion 5q and a lower skirt portion 8q which are held together by frangible connection 12q. The upper cap portion of the outside cap 44q is formed with an annular collar 58q located at the bottom and having a number of openings 32q formed in it and peripherally spaced one from another. The external surface above the annular collar has a number of peripherally located ribs 59q uniformly disposed one from another, by means of which the cap can be gripped to facilitate screwing and unscrewing. The lower skirt portion 8q of the outside cap 44q is formed with its inner surface 38q in close proximity with the outer surface of an annular collar 58q. A number of ribs 33q are formed on the inside diameter of the skirt 8q under openings 32q formed in the annular collar and are spaced from the upper edge of a lower skirt portion. The upper surface 34q of each rib 33q has the same top projection as the openings 58q and is formed at an angle to guarantee a reliable engagement between the skirt 8q and container annular collar 6q.

Thus, closure 1q is applied to the neck of the container 2q in a conventional manner. Once so applied, ribs 33q formed on a skirt 8q become engaged with the bottom surface of an annular collar 6q formed on the neck of the container. Any attempt to remove the closure 1q from container 2q will result in fracturing of the thin bridges of material 12q connecting the upper portion and lower skirt of an outside cap 44q. Such fracturing will be readily apparent to the user and thus, closure 1q is a child-resistant, tamper-evident closure.

The embodiment of FIG. 35 shows a child-resistant, tamper-evident, push-on type closure 1R which is similar to the closure shown in FIG. 24. However, to further improve the tamper-evident characteristics of the closure, an additional collar 7R is formed on the container 2R to cooperate with the bottom surface 11R of the skirt 8R. This cooperation hinders prying the closure 1R off container 2R.

The embodiment of FIG. 36 shows a tamper-evident, push-on type closure 1S which is similar to the closure shown in FIG. 24. However, the upper portion of closure 1S and the container neck portion 2S are formed differently. An annular collar 50S is formed on the inner surface of an upper cap portion for interlocking engagement with annular collar 53S formed on the container neck.

Thus, closure 1S is pushed onto container in a conventional manner. Once so applied, any attempt to remove the closure from the container will result in cooperation between the top surface of ribs 33S with the bottom surface of the annular collar 6S which must result in fracturing of the closure 1S at the weakened area 12S. When it is desired to remove the closure from the container 2S to get access to the contents therebetween, one needs only to pull the tab 57S and separate the skirt 8S from the upper portion 5S. To take the upper cap portion from the container one needs only to push the tab 60S up in any position.

An additional collar 7S is formed on the container 2S to cooperate with the bottom surface 11S of the skirt 8S. This cooperation hinders prying the closure 1R off container 2R.

Various possible embodiments, forms and modifications of the invention, coming within the proper scope and spirit of the appended claims, will of course readily suggest themselves to those skilled in the art. Thus, while there has been described what is at present considered to be the preferred embodiments of the invention, it will be obvious to those skilled in the art that various changes and modifications may be made therein, without departing from the invention, and it is, therefore aimed in the appended claims to cover all such changes and modifications as fall within the true spirit and scope of the invention, and it is understood that, although I have shown the preferred form of my invention, that various modifications may be made in the details thereof, without departing from the spirit as comprehended by the following claims.

What is claimed is:

1. A plastic unitary molded child-resistant, snap-on, tamper-evident closure for operative association with a container which includes a neck portion having an external upper annular collar with a gap and a lower annular collar formed therebelow, the lower annular collar including an outer peripheral wall and lower annular wall extending inwardly from a lower end of said outer peripheral wall, said closure comprising:
   a. an upper cap portion having internal ribs disposed for cooperation with the upper annular collar, said ribs including a plurality of spaced ribs only one of which is of a size to pass through the gap of said upper annular collar, and said upper cap portion includes indication means indicting the location of said rib sized to pass through said gap;
   b. a lower skirt portion connected to the upper cap portion and having an inside diameter that is close to the outside diameter of the upper cap portion;
   c. weakened intermediate portions circumferentially formed about the closure at the connection between the lower skirt portion and the upper cap portion;
   d. said upper cap portion including about its circumference a plurality of vertically extending intermittently spaced grooves extending down to the weakened intermediate portions;
   e. a plurality of corresponding openings which separate the weakened intermediate portions and extend through the connection between the upper cap portion and the lower skirt portion;
   f. a number of radially inwardly directed ribs located on the interior surface of the lower skirt portion for locking engagement with the annular collar of the container;
   g. said ribs being longitudinally aligned with the grooves on the upper cap portion;
   h. said ribs being vertically spaced from the upper end of said lower skirt portion; and
   i. said ribs lockingly engaging said lower annular collar at an engagement portion on said lower annular wall which is inwardly spaced from said outer peripheral wall when the closure is assembled with the container.

2. The closure of claim 1, wherein said grooves formed in the upper cap portion are widened to the extent of forming a plurality of vertically extending intermittently spaced ribs extending down to the lower skirt portion providing weakened intermediate portions circumferentially formed about the closure at the connection between the lower skirt portion and the upper cap portion.

3. The closure of claim 1, wherein the neck portion includes a third annular collar below the upper and lower annular collars and the lower skirt portion has a bottom edge in close proximity to the third annular collar of the container when the closure is in assembled position on the container so that the closure cannot be pried off.

4. A plastic unitary molded tamper-evident closure formed to cooperate with a container having a threaded neck portion and interlocking elements disposed below the threaded neck portion, the closure having an upper cap portion with internal threading formed to cooperate with a threaded neck portion of a container and a lower skirt portion located under said cap and formed to have interlocking elements constructed for engagement with container interlocking elements and connected to each other by frangible means interconnecting said skirt portion to said cap such that relative rotational, axial, or both movements between said skirt portion and said cap portion will effect in fracturing of said frangible means and separation of said cap portion from said skirt portion, comprising:
   a. the upper cap portion having an area of increased thickness of material formed as an annular collar at the bottom end of said cap portion;
   b. the upper cap portion having a number of peripherally displaced one from another vertically extending openings formed in the area of increased thickness at the bottom end of said upper cap portion;
   c. the lower skirt portion having an inner diameter formed in close proximity with the outer diameter of said area of increased thickness of said upper cap portion;

d. the lower skirt portion having a number of inwardly directed ribs peripherally displaced one from another on the inner diameter of said skirt and located right under said openings;

e. said ribs formed on the inner surface of said lower skirt portion and having a thickness comparable to the depth of said openings formed above;

f. said ribs having a top surface formed at an angle of 90 degrees or less to the inner surface of said skirt;

g. said ribs located inside the periphery of said area of increased thickness;

h. said ribs spaced from the upper end of said lower skirt portion.

5. The closure of claim 4, wherein the inner diameter of said skirt portion is smaller and the outer diameter is bigger than the outer diameter of said area of increased thickness; with said skirt portion having a plurality of grooves formed on the inner surface in line with said openings, and a number of inwardly directed ribs formed at the ends of said grooves.

6. The closure of claim 4, wherein said openings are formed with a generally triangular top projection providing said ribs with a triangular top surface formed as a ratchet for engagement with ratchets formed under the container annular collar, and thus providing an additional engagement between said skirt portion and said container.

7. The closure of claim 4, wherein said area of increased thickness formed at the bottom of said cap has a periphery formed as a regular "n"-sided polygon which in conjunction with the inner diameter of said skirt portion forms "n" openings having a top projection of a circular segment, providing said skirt portion with a plurality of ribs formed in line and under said openings.

8. The closure of claim 4, wherein the closure is formed to be child-resistant; said closure including an inner cap and outer cap and a cap connection disposed therebetween to facilitate operation of said inner cap by said outer cap only by following a predetermined operation routine; and said skirt portion extends from said outer cap and connects to said outer cap by said frangible means.

9. A cup-shaped plastic unitary molded tamper-evident closure for operative association with a container which includes a neck portion having an annular collar, the annular collar including an outer peripheral wall and a lower annular wall extending inwardly from a lower end of said outer peripheral wall, said closure comprising:

a. an upper cap portion;

b. a lower skirt portion connected to the upper cap portion and having an inside diameter that is closed to the outside diameter of the upper cap portion;

c. weakened intermediate portions circumferentially formed about the closure at the connection between the lower skirt portion and the upper cap portion;

d. said upper cap portion including about its circumference a plurality of vertically extending intermittently spaced grooves extending down to the level of the weakened intermediate portions;

e. a plurality of corresponding openings which separate the weakened intermediate portions and extend through the connection between the upper cap portion and the lower skirt portion;

f. a number of radially inwardly directed ribs located on the interior surface of the lower skirt portion for locking engagement with the annular collar of the container;

g. said ribs being longitudinally aligned with the grooves on the upper cap portion;

h. said ribs being vertically spaced from the upper end of said lower skirt portion; and i. said ribs lockingly engaging said annular collar at an engagement portion on said lower annular wall which is inwardly spaced from said outer peripheral wall when the closure is assembled with the container.

10. The closure of claim 9, wherein the weakened intermediate portions are formed by thin bridges of material connecting the upper cap portion and the lower skirt portion.

11. The closure of claim 9, wherein the neck portion includes a second annular collar below the first-mentioned annular collar and the lower skirt portion has a bottom edge in close proximity to the second annular collar of the container when the closure is in assembled position on the container so that the closure cannot be pried off.

12. A cup-shaped plastic unitary molded tamper-evident closure for operative association with a container which includes a neck portion and an annular collar, the annular collar including an outer peripheral wall and a lower annular wall extending inwardly from a lower end of said outer peripheral wall, said closure comprising:

a. an upper cap portion having child-resistant means;

b. a lower skirt portion connected to the upper cap portion and having an inside diameter that is close to the outside diameter of the upper cap portion;

c. weakened intermediate portions circumferentially formed about the closure at the connection between the lower skirt portion and the upper cap portion;

d. said upper cap portion including about its circumference a plurality of vertically extending intermittently spaced grooves extending down to the level of the weakened intermediate portions;

e. a plurality of corresponding openings which separate the weakened intermediate portions and extend through the connection between the upper cap portion and the lower skirt portion;

f. a number of radially inwardly directed ribs located on the interior surface of the lower skirt portion for locking engagement with the annular collar of the container;

g. said ribs being longitudinally aligned with the grooves on the upper cap portion;

h. said ribs being vertically spaced from the upper end of said lower skirt portion; and i. said ribs lockingly engaging said annular collar at an engagement portion on said lower annular wall which is inwardly spaced from said outer peripheral wall when the closure is assembled with the container.

13. The closure of claim 12, wherein the weakened intermediate portions are formed by thin bridges of material connecting the upper cap portion and the lower skirt portion.

14. The closure of claim 12, wherein the neck portion includes a second annular collar below the first-mentioned annular collar and the lower skirt portion has a bottom edge in close proximity to the second annular collar of the container when the closure is in assembled position on the container so that the closure cannot be pried off.

15. The closure of claim 12, wherein said upper cap portion includes an inner cap, an outer cap and cap connection means disposed therebetween for facilitating operation of said inner cap by said outer cap only following a predetermined operation routine.

16. The closure of claim 12, wherein said neck portion has external threads formed therearound and said inner cap has interanl threads for mating engagement with the external threads of the neck portion.

* * * * *